United States Patent
Singh

(10) Patent No.: US 12,438,904 B2
(45) Date of Patent: Oct. 7, 2025

(54) SYSTEMS AND METHODS FOR ZERO-SHOT DETECTION OF MALICIOUS NETWORK COMMUNICATIONS THROUGH DEPLOYMENT OF ARTIFICIAL INTELLIGENCE TECHNIQUES

(71) Applicant: InceptionCyber.ai, Inc., Palo Alto, CA (US)

(72) Inventor: Abhishek Singh, Morgan Hill, CA (US)

(73) Assignee: InceptionCyber.ai, Inc., Palo Alto, CA (US)

( * ) Notice: Subject to any disclaimer, the term of this patent is extended or adjusted under 35 U.S.C. 154(b) by 52 days.

(21) Appl. No.: 18/662,868

(22) Filed: May 13, 2024

(65) Prior Publication Data

US 2025/0184346 A1 Jun. 5, 2025

Related U.S. Application Data

(60) Provisional application No. 63/606,089, filed on Dec. 4, 2023.

(51) Int. Cl.
*H04L 9/40* (2022.01)
*G06F 40/30* (2020.01)

(52) U.S. Cl.
CPC .......... *H04L 63/1433* (2013.01); *G06F 40/30* (2020.01); *H04L 63/0236* (2013.01); *H04L 63/1441* (2013.01); *H04L 63/145* (2013.01)

(58) Field of Classification Search
CPC ............. H04L 63/1433; H04L 63/0236; H04L 63/1441; H04L 63/145; G06F 40/30

USPC ............................................................ 726/22
See application file for complete search history.

(56) References Cited

U.S. PATENT DOCUMENTS

| | | | |
|---|---|---|---|
| 10,050,998 B1 * | 8/2018 | Singh | H04L 63/145 |
| 10,110,496 B2 * | 10/2018 | Langton | H04L 63/0428 |
| 2013/0227689 A1 * | 8/2013 | Pietrowicz | H04L 43/12 726/23 |
| 2014/0007233 A1 * | 1/2014 | Roesch | H04L 63/1466 726/22 |
| 2014/0150095 A1 * | 5/2014 | Zhao | H04L 63/1458 726/22 |
| 2019/0199745 A1 * | 6/2019 | Jakobsson | H04L 51/212 |
| 2021/0021612 A1 * | 1/2021 | Higbee | H04L 63/1416 |

* cited by examiner

*Primary Examiner* — Teshome Hailu
(74) *Attorney, Agent, or Firm* — Rutan & Tucker LLP; Kyle St. James

(57) ABSTRACT

A computerized method is disclosed including operations of obtaining and parsing an electronic message into components including body and subject line information and determining a likelihood that the electronic message is directed to one of a predefined set of topics by deploying a probabilistic generative model, wherein the electronic message has a likelihood of being directed to a first topic of at least a first threshold. The operations may also include generating a prompt for a language model based on the first topic, providing the prompt and the body and subject line information of the electronic message to the language model, and generating a semantic result based on a response to the prompt from the language model. The electronic message may be classified by a relationship compiler or a neural network as malicious or benign based on the semantic result.

15 Claims, 15 Drawing Sheets

SYSTEMS AND METHODS FOR ZERO-SHOT DETECTION OF MALICIOUS NETWORK COMMUNICATIONS THROUGH DEPLOYMENT OF ARTIFICIAL INTELLIGENCE TECHNIQUES

CROSS-REFERENCE TO RELATED APPLICATIONS

This application claims the benefit of priority on U.S. Provisional Application No. 63/606,089 filed Dec. 4, 2023, the entire contents of which are incorporated by reference herein.

FIELD

Embodiments of the disclosure relate to the field of malware, compromised electronic messages (emails), and/or phishing emails. More specifically, one embodiment of the disclosure relates to a system for a multi-phase analysis of an email that includes analyzing the body and subject of an email using machine learning models and/or neural networks, analyzing attachments to and uniform resource locators (URLs) located in the email using natural language processing and/or neural networks, and performing a semantic analysis of header information of the email, where the results of all three phases are provided as input to a neural network in order to determine whether the email is malicious and/or phishing.

BACKGROUND

Phishing is a form of cyberattack where attackers use deceptive techniques to trick individuals into revealing sensitive information, such as usernames, passwords, credit card numbers, or personal details. These attacks often occur via email but can also happen through other communication channels like text messages or social media. According to the Internet Crime Complaint Center (IC3) reports, phishing/spoofing is defined as follows: The use of unsolicited email, text messages, and telephone calls purportedly from a legitimate company requesting personal, financial, and/or login credentials.

In email-based phishing attacks, perpetrators (bad actors or cyberattackers) send fraudulent emails disguised as legitimate messages from trusted organizations or individuals. These emails typically contain links to fake websites or attachments containing malware. The goal is to persuade recipients to click on the links or open the attachments, thereby compromising their security.

A few common types of phishing emails are often referred to as spear phishing, clone phishing, and whaling. Spear phishing emails represent targeted attacks on a particular individual through the use of information relevant to or gathered about the recipient. Clone phishing emails typically replicate or mimic emails from legitimate sources such as well-known websites or financial institutions. Whaling emails are similar to spear phishing but typically target high-level employees such as chief executive officers or chief financial offers and seek to extract sensitive financial information.

One typical goal of a phishing attack is to deceive an individual into taking a specific action such as providing sensitive information, e.g., login credentials or financial data, to a perpetrator through a phishing webpage or replying to a phishing email. Another goal of the threat actor may be to deceive the individual into downloading an attachment which can lead to various malicious activities, including compromise of credentials, financial fraud, and the deployment of malware such as Ransomware, BackDoor, Crypto Miner, Password Stealer, Dropper, Launcher, Data Miner, Tunneler, Keylogger, Point of Sale malware, worms, etc.

BRIEF DESCRIPTION OF THE DRAWINGS

Illustrative examples are described in detail below with reference to the following figures.

DETAILED DESCRIPTION

I. Terminology

Figure 1:
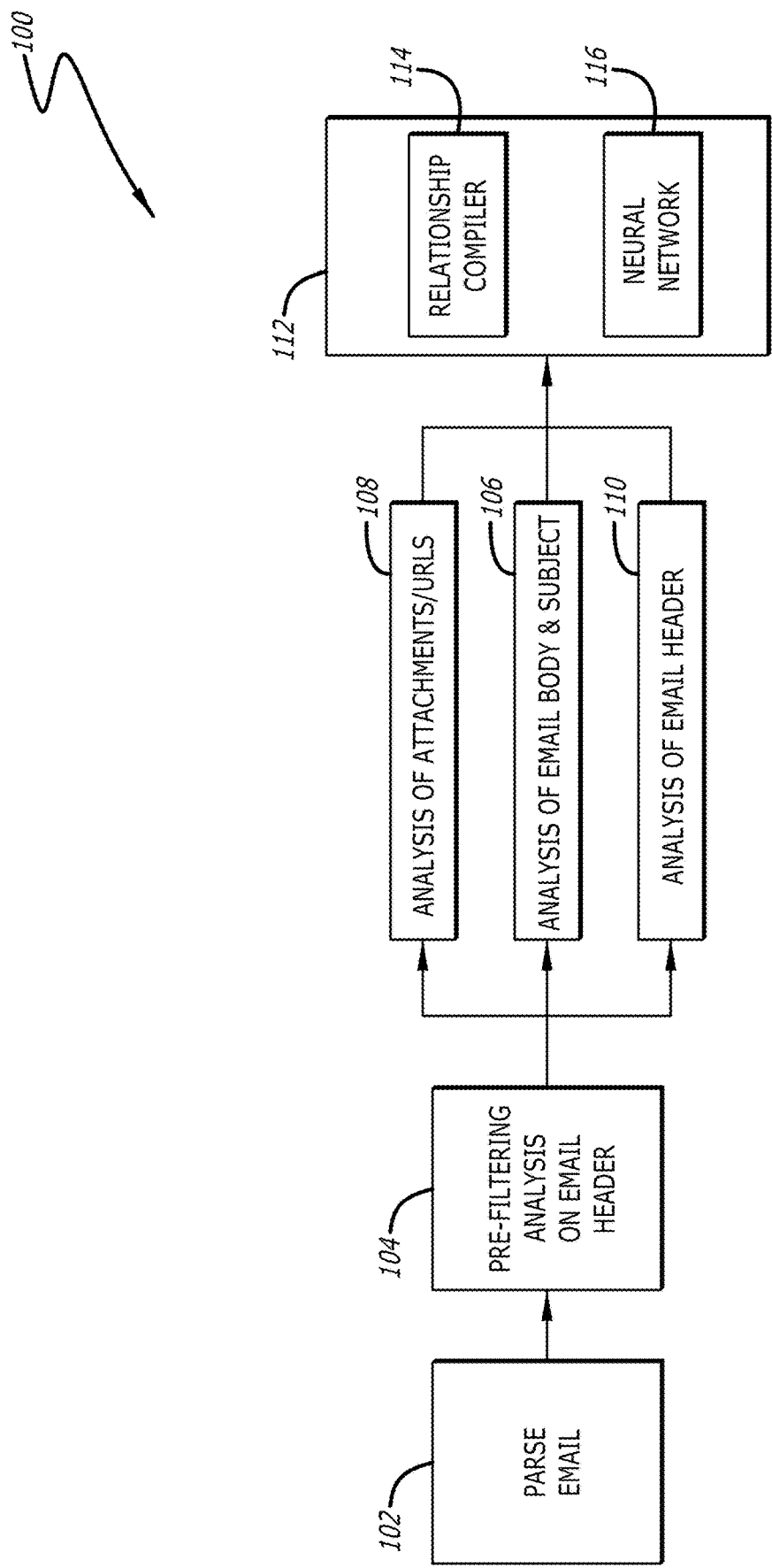
FIG. 1 is a diagrammatic flow illustrating a first example methodology of detecting malicious or phishing network communications through deployment of a plurality of artificial intelligence according to an embodiment of the disclosure.

In the following description, certain terminology is used to describe various features of the invention. For example, each of the terms "logic," "engine," and "component" may be representative of hardware, firmware or software that is configured to perform one or more functions. As hardware, the term logic (or component) may include circuitry having data processing and/or storage functionality. Examples of such circuitry may include, but are not limited or restricted to a hardware processor (e.g., microprocessor, one or more processor cores, a digital signal processor, a programmable gate array, a microcontroller, an application specific integrated circuit "ASIC", etc.), a semiconductor memory, or combinatorial elements.

Additionally, or in the alternative, the logic (or component) may include software such as one or more processes, one or more instances, Application Programming Interface(s) (API), subroutine(s), function(s), applet(s), servlet(s), routine(s), source code, object code, shared library/dynamic link library (dll), or even one or more instructions. This software may be stored in any type of a suitable non-transitory storage medium, or transitory storage medium (e.g., electrical, optical, acoustical or other form of propagated signals such as carrier waves, infrared signals, or digital signals). Examples of a non-transitory storage medium may include, but are not limited or restricted to a programmable circuit; non-persistent storage such as volatile memory (e.g., any type of random access memory "RAM"); or persistent storage such as non-volatile memory (e.g., read-only memory "ROM", power-backed RAM, flash memory, phase-change memory, etc.), a solid-state drive, hard disk drive, an optical disc drive, or a portable memory device. As firmware, the logic (or component) may be stored in persistent storage.

Herein, a "communication" generally refers to related data that is received, transmitted, or exchanged within a communication session. The data may include a plurality of packets, where a "packet" broadly refers to a series of bits or bytes having a prescribed format. Alternatively, the data may include a collection of data that may take the form of an individual or a number of packets carrying related payloads, e.g., a single webpage received over a network.

The term "computerized" generally represents that any corresponding operations are conducted by hardware in combination with software and/or firmware.

The term "object" generally relates to content (or a reference to access such content) having a logical structure or organization that enables it to be classified for purposes of analysis as a cyberthreat such as malware or phishing. The content may include an executable (e.g., an application, program, code segment, a script, dynamic link library "dll" or any file in a format that can be directly executed by a computer such as a file having an extension of ".exe", ".vbs", ".js", etc.), a non-executable (e.g., a storage file; any document such as a Portable Document Format "PDF" document; a word processing document such as Word® document; an electronic mail "email" message, web page, etc.), or simply a collection of related data. Additionally, the term object may refer to an instance of an executable that is executing ("a process"). In one embodiment, an object may be an image data such as one or more images and/or videos. In another embodiment, an object may be a set of instructions that are executable by one or more processors. The object may be retrieved from information in transit (e.g., one or more packets, one or more flows each being a plurality of related packets, etc.) or information at rest (e.g., data bytes from a storage medium).

Examples of objects may include one or more flows or a self-contained element within a flow itself. A "flow" generally refers to related packets that are received, transmitted, or exchanged within a communication session. For convenience, a packet is broadly referred to as a series of bits or bytes having a prescribed format, which may, according to one embodiment, include packets, frames, or cells. Further, an "object" may also refer to individual or a number of packets carrying related payloads, e.g., a single webpage received over a network. Moreover, an object may be a file retrieved from a storage location over an interconnect. As a self-contained element, the object may be an executable (e.g., an application, program, segment of code, dynamically link library "DLL", etc.) or a non-executable. Examples of non-executables may include a document (e.g., a Portable Document Format "PDF" document, MICROSOFT® OFFICE® document, MICROSOFT® EXCEL® spreadsheet, etc.), an electronic mail (email), downloaded web page, or the like.

According to one embodiment, the term "malware" may be construed broadly as any code or activity that initiates a malicious attack and/or operations associated with anomalous or unwanted behavior. For instance, malware may correspond to a type of malicious computer code that executes an exploit to take advantage of a vulnerability, for example, to harm or co-opt operation of a network device or misappropriate, modify, or delete data. Malware may also correspond to an exploit, namely information (e.g., executable code, data, command(s), etc.) that attempts to take advantage of a vulnerability in software and/or an action by a person gaining unauthorized access to one or more areas of a network device to cause the network device to experience undesirable or anomalous behaviors. The undesirable or anomalous behaviors may include a communication-based anomaly or an execution-based anomaly, which, for example, could (1) alter the functionality of an network device executing application software in an atypical manner (a file is opened by a first process where the file is configured to be opened by a second process and not the first process); (2) alter the functionality of the network device executing that application software without any malicious intent; and/or (3) provide unwanted functionality which may be generally acceptable in another context. Additionally, malware may be code that initiates unwanted behavior which may be, as one example, uploading a contact list from an endpoint device to cloud storage without receiving permission from the user.

The term "network device" may be construed as any electronic computing system with the capability of processing data and connecting to a network. Such a network may be a public network such as the Internet or a private network such as a wireless data telecommunication network, wide area network, a type of local area network (LAN), or a combination of networks. Examples of a network device may include, but are not limited or restricted to, an endpoint (e.g., a laptop, a mobile phone, a tablet, a computer, etc.), a standalone appliance, a server, a router or other intermediary communication device, a firewall, etc.

The term "rules" refers to logic used in executing certain operations, wherein execution may vary (or not occur) based on a rule. Each rule is capable of being represented as a logical expression for example, such as an "if this, then that" statement, where "this" represents a condition, and "that" represents the conclusion. The conclusion is applied when the condition is met by analysis of parameters (predetermined or dynamically obtained). The term "implicated rules," as used herein, are the one or more specific rules applied in reaching a verdict, reflecting predetermined or dynamically obtained parameters and the conclusions drawn from them based on the logical expressions.

According to one embodiment of the disclosure, rules may also provide configuration information containing parameter values such as, for example, threshold values used in detection (e.g., specifying a time a player has a ball, a velocity of a pass or shot, a number of goals, etc.). Rules may be stored in a rules store (e.g., a repository) in persistent memory of a network device and are typically updated frequently (periodically or aperiodically).

Finally, the terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps or acts are in some way inherently mutually exclusive.

As this invention is susceptible to embodiments of many different forms, it is intended that the present disclosure is to be considered as an example of the principles of the invention and not intended to limit the invention to the specific embodiments shown and described.

II. Operational Flows

A. General Flow

Referring to FIG. 1, a diagrammatic flow illustrating a first example methodology of detecting malicious or phishing network communications through deployment of a plurality of artificial intelligence is shown according to an embodiment of the disclosure. The methodology 100 provides a high-level depiction of operations performed in analyzing a network communication, e.g., an email, in order to detect phishing or maliciousness. Each block illustrated in FIG. 1 represents an operation in the process 100 performed by, for example, a cyberthreat detection system 1408 of FIG. 14. It should be understood that not every operation illustrated in FIG. 1 is required. In fact, certain operations may be optional to complete aspects of the process 100. The process 100 begins with obtaining and parsing an email (block 102). In some embodiments, an email may be parsed into various sections or components including sender information (name, email address, organization if applicable), recipient information (email addresses in "to:", "Cc:", and/or "Bcc"), date and time of sending, subject line, body (text, HTML, rich text, embedded images or other media, uniform resource locators (URLs)), headers (message-ID, references, in-reply-to, MIME-version, etc.), attachments (file name, file type, file size, etc.), metadata (message ID, importance level, flags, delivery status, etc.), embedded objects (inline images, inline attachments, linked resources such as images linked in HTML), structural information (quoted text, original message, signature block, etc.). Any combination of these components may be considered features of an email and referred to as such throughout the disclosure.

Following parsing of the email, a pre-filtering analysis may be performed on the email header and other components (block 104). In some examples, the pre-filtering analysis includes analyzing header and subject features to make an initial determination as to whether the email should be passed through to the recipient, mail client, or merely logged as non-malicious or whether the email should proceed to the multi-phased analyses of blocks 106-110. Thus, the pre-filtering analysis helps to achieve scalability by reducing the number of emails by the resource-intensive processing of machine learning models and neural networks.

In some particular embodiments, a first operation of the pre-filtering analysis may include identifying or detecting attachments or call-to-action URLs. When an email does not include an attachment or a call-to-action URL, the email may bypass the rest of the cyberthreat detection system and be delivered to the recipient, mail client, or merely logged as non-malicious. A call-to-action (CTA) URL may be understood as a hyperlink or web address embedded within a component of the email that is intended to prompt the viewer to take a specific action by directing the viewer to a webpage to make a purchase, directing the user to register for a service, newsletter, event, etc., download an application or document, etc.

A second operation of the pre-filtering analysis may include identifying whether the email was automatically generated by a known entity (e.g., Meta Platforms, Inc. (provides FACEBOOK®), or Atlassian Corporation Plc. (provides JIRA®). As an example, a predetermined allow-list may be curated that includes specific email addresses in in the "From" field and predefined subject lines, such that a one-to-one match between either or both of the content in the emails From field or subject and that of the allow-list results in the email bypassing the rest of the cyberthreat detection system and being delivered to the recipient, mail client, or merely logged as non-malicious.

A third operation of the pre-filtering analysis may include detection of the email being provided in a specified language, e.g., English or a non-English language, e.g., based on the subject line and/or body content. In some instances, an email indicated as being in a non-English language will bypass the rest of the cyberthreat detection system and being delivered to the recipient, mail client, or merely logged as non-malicious. It is noted that English is merely one example. Other languages may be detected and enable the email to bypass the rest of cyberthreat detection system.

In some embodiments, a fourth operation of the pre-filtering analysis may include identification of the number of images attached and/or determination of the size of one or more of the images (e.g., individually or in combination). In some instances, an email that includes at least a threshold number of image attachments (e.g., JPEG, PNG, etc.) may bypass one aspect of the cyberthreat detection system, e.g., the processing of images of attachments by a neural network configured to detect text within an image. In some examples, such a neural network may be a deep learning neural network that is pre-trained to associate images and corresponding textual descriptions. The deep learning neural network may be trained on a transformer-based neural network architecture that encodes images and text into a feature space. Such a deep learning neural network may be configured to map images and text into the same embedding space such that semantically similar images and text are grouped together. This allows the deep learning neural network to semantically associate images with text, e.g., brand names. As a result, the deep learning neural network may be trained and fine-tuned to associate images with text representing a corporate entity's brand, logo, or name. One example of such a deep learning neural network may be a Contrastive Language-Image Pretraining (CLIP) model. While the term "CLIP model" is utilized below, such is not intended to be limiting to that particular deep learning neural network model but is done so for illustrative purposes only. In some embodiments, the threshold may be three (3) image attachments. In other embodiments, the threshold may instead be directed to the size (bytes) of any single image attachment or a total size (bytes) of multiple image attachments together, such that meet or exceeding that threshold results in the email bypassing processing by the CLIP model.

In yet a fifth operation in some examples, an operation of the pre-filtering analysis may include identification of the file extension type of an attachment of the email such that when the file extension of the attachment is one of a predefined allow-list, the email will bypass the rest of the cyberthreat detection system and being delivered to the recipient, mail client, or merely logged as non-malicious. Example file extension types that may be include on an allow-list include .ics, .vcs, .pst, and/or .gcal, which are known formats for exchanging calendar and scheduling information.

Following the pre-filtering analysis and in the instances in which the email was not identified by the pre-filtering analysis as bypassing the rest of the cyberthreat detection system, the parsed email features are then provided to one or more of the blocks 106-110 in serial, in parallel, or concurrently (at least partially overlapping in time). The operations of each of the analyses performed in the blocks 106-110 will be described in greater detail below and in accordance with many of the remaining figures. Briefly, the block 106 includes an analysis of the features of the email body and subject through deployment of a probabilistic generative model such as a Latent Dirichlet Allocation (LDA) model to determine the likelihood that the email is directed to each of a predefined set of topics (such as those known to be used by cyber attackers), and the email is determined to include or be directed to a topic appearing on a list of desired topics, one or more artificial intelligence models may be deployed to determine or classify the semantics of the email body or subject.

It should be understood that other statistical models may be used for topic modeling besides Latent Dirichlet Allocation (LDA). Examples of alternative statistical models include, but are not limited to, BERT Topic models, Non-Negative Matrix Factorization, Latent Semantic Analysis (LSA)/Latent Semantic Indexing (LSI), Correlated Topic Model (CTM), Hierarchical Dirichlet Process (HDP), Word Embedding-based methods (e.g., Word2Vec, Doc2Vec), Probabilistic Latent Semantic Analysis (PLSA), etc.

The block 108 may include an analysis of attachments and/or URLs of the email. Images may be extracted with text extracted therefrom and provided to the LDA modeling of the block 106. Additionally, the images may be analyzed by a CLIP model to extract brand names within the image. Further, deep parsing may be performed on an attachment as described below. Yet further, heuristics may be performed on any URLs identified within the email (e.g., to determine whether a URL is hosted on a file sharing website, includes redirect webpage links (redirects), is a suspicious URL by not conforming to Request for Comments (RFCs) defining the HTTP protocol).

The results of the operations of the blocks 106-110 are provided to an expert system 112 that includes a relationship compiler 114 that may apply a set of heuristics or other rules to determine if an attachment or URL is malicious or whether the email has been transmitted from a compromised email account, and a neural network 116 configured and fine-tuned to determine whether the email is malicious or phishing based on the parsed feature set and results of one or more of the operations of the blocks 106-110.

Figure 2:
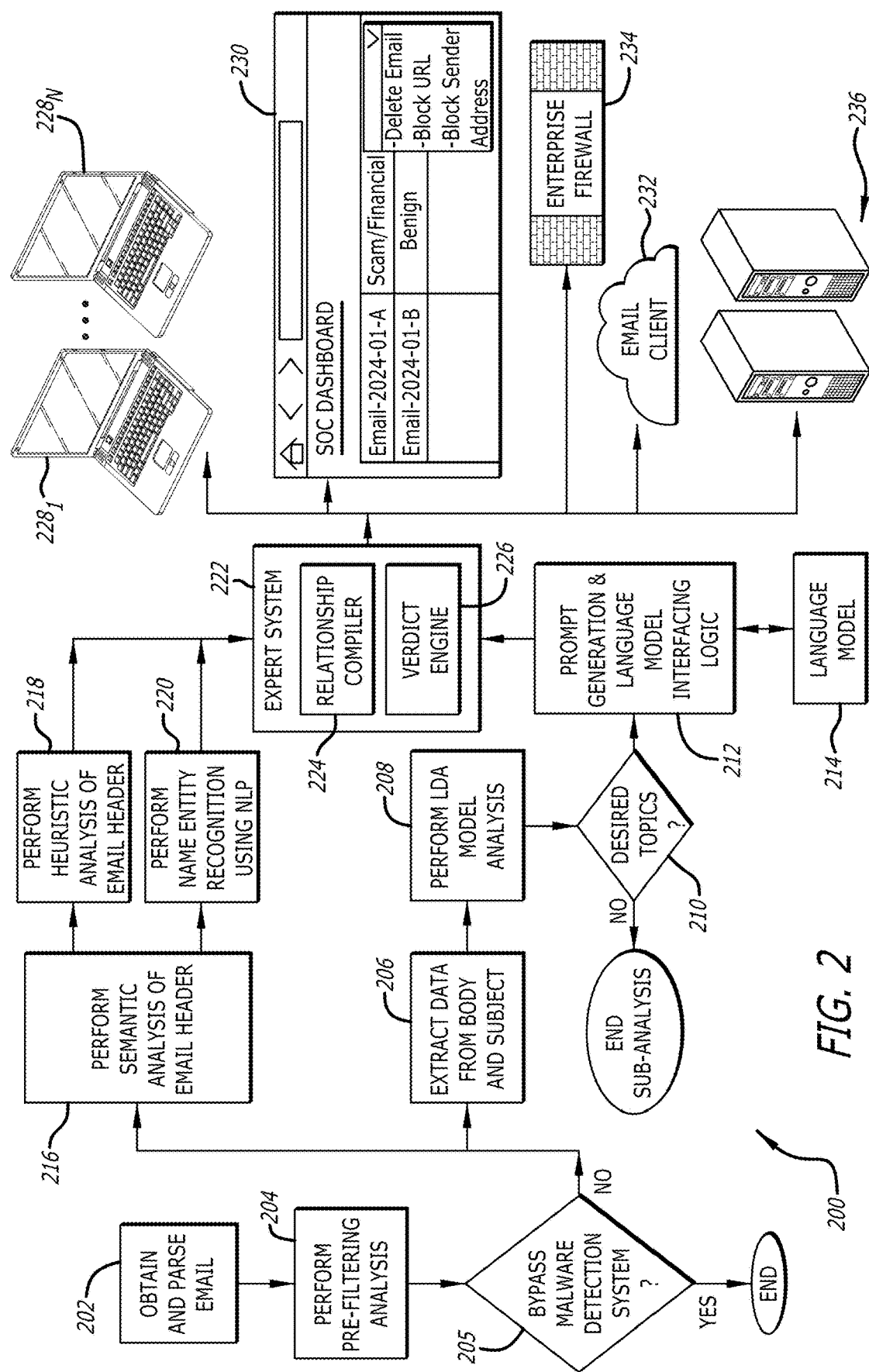
FIG. 2 is a diagrammatic flow providing a detailed example of a first implementation of the flow of FIG. 1 including deployment of a language model according to an embodiment of the disclosure.

Referring now to FIG. 2, a diagrammatic flow providing a detailed example of a first implementation of the flow of FIG. 1 including deployment of a language model is shown according to an embodiment of the disclosure. The process 200 illustrates additional detail for an embodiment of the process 100 of FIG. 1. Each block illustrated in FIG. 2 represents an operation in the process 200 performed by, for example, a cyberthreat detection system 1408 of FIG. 14. It should be understood that not every operation illustrated in FIG. 2 is required. In fact, certain operations may be optional to complete aspects of the process 200. The process 200 begins with begins with obtaining and parsing an email (block 202). An email may be parsed into various sections or components as described above. Following parsing of the email, a pre-filtering analysis may be performed on the email header to make an initial determination as to whether the email should be passed through to the recipient, mail client, or merely logged as non-malicious or whether the email should proceed for further analysis (block 204). Various pre-filtering operations are described in detail above with respect to FIG. 1 and any combination of one or more may be implemented at block 204. A determination is then made as to whether the pre-filtering analysis identified the email for bypassing the rest of the cyberthreat detection system (block 205). When the email is determined to bypass the rest of the cyberthreat detection system, the email may be passed through to the recipient, mail client, or merely logged as non-malicious and the cyberthreat analysis ends.

When the email is determined to proceed with further analysis by the cyberthreat detection system, the parsed email features are then provided to one or more of the blocks 206, 216 in serial, in parallel, or concurrently (at least partially overlapping in time). In some embodiments, the block 206 includes an analysis of the features of the email body and subject through deployment of one or more artificial intelligence models to determine or classify the semantics of the email body or subject.

Referring to a first phase or aspect of the email analysis, data is extracted from the email body and subject line (block 206). The extracted data is provided as to a probabilistic generative model such as a LDA model (block 208). The LDA model may be configured to determine the likelihood that the email body or subject includes or is directed to each of a predefined set of topics, e.g., detect latent topics within the email. As a summary of the operability of the LDA model, the LDA model may initially begin analysis of the extracted text of an email body and subject by randomly assigning each word in the email to one of K topics, where K represents the number of the predefined set of topics. The LDA model further initializes a distribution over the predefined set of topics, and a distribution over words in a defined vocabulary. Next, two steps are performed in an iterative manner, first, based the current assignment of words in the email to the predefined set of topics and the current topic distribution, estimate the probability that each word in the email belongs to each topic. Estimation of this probability computes the posterior probability of the predefined set of topics given the words of the email using Bayes' theorem. Second, based on the estimated topic distributions, the parameters of the LDA model are updated to maximize the likelihood of the words in the email by updating the topic distribution for the email and the word distributions for each topic based on the estimated topic assignments. The two steps above are iterated over until a convergence criteria is met, e.g., parameter change falls below a threshold amount each iteration. As a result, the LDA model provides the probability of each topic appearing in the email body and subject.

When the LDA model determines that the email body or subject is not directed to one of a predefined list of desired topics (no at block 310), the first phase of the email analysis ends. However, when the LDA model determines that the email body or subject is directed to one of the predefined list of desired topics (yes at block 310), one or more prompts may be automatically generated based on the extracted data and a single topic determined by the LDA model as being the topic having the greatest probability of being included in or to which the email body and subject is directed. In other embodiments, a plurality of topics may be utilized (e.g., 2-3 topics having the greatest probability). For example, the cyberthreat detection system 1408 (see FIG. 14) may include logic configured to receive one or more topics and retrieve one or more predefined prompt scripts from a prompt data store. The logic 212 may be configured to insert components of the email body and subject into a predefined prompt script and transmit the completed prompt to a language model (block 214). In other embodiments, the logic 212 may provide a predefined prompt along with the email body and subject, and optionally, a topic determined by the LDA topic modeling, to the language model 214, which is configured to return a response (e.g., "Yes" or "No"). The language model in turn processes the prompt and returns a response, and the prompt generation and language model interfacing logic 212 may generate a semantic result indicating at least that the semantics of the email body or subject are or are not directed to the first topic based on the response of the language model.

which represents zero-shot semantics of the email body and subject. The response is provided to an expert system 222 for further processing or analysis leading to a determination to the maliciousness of the email. FIG. 2 illustrates that the expert system 222 may include a relationship compiler 224 and a verdict engine 226 (e.g., a neural network). In some embodiments, the relationship compiler 224 may perform a plurality of heuristics on the semantics generated as a result of the analyses (or sub-analyses) performed by the cyberthreat detection system such as the heuristic analysis of the header and the name entity recognition (blocks 218, 220) and/or the language model analysis (blocks 212, 214). Additionally, other drawings discussed throughout the disclosure provide for other analyses (or sub-analyses) that also provided semantics to an expert system. It should be understood that the different embodiments disclosure herein may be combined such that the expert systems shown in the figures may receive any combination of the semantics resulting from analyses described herein.

More specifically, the relationship compiler 222 performs heuristics such as a set of rules on the semantics, where semantics generated by a particular component, analysis, or sub-analysis may represent a feature as used within a rule as discussed below. However, in one particular embodiment, the relationship compiler 222 may utilize durable rules and combine the features, e.g., semantic results, from analyses of the email body, subject, and/or header, deep file parsing results, and analyses of URLs, where the durable rules implement "OR." "AND," and "NOT" operators to combine features and determine satisfaction of the rule. An illustrative example of a durable rule is as follows:

```
with ruleset('png"):
@when_all(
m.attachment.file_semantic.anyItem(item.matches
('p_invoice_c_call_to_action|p_financial_c_call_to_action')) &
m.attachment.file_semantic.anyItem(item == 'has_known_brand') &
m.email.sender_context.anyItem(item == 'is_free_email') & m.email.
sender_context.anyItem(item == 'is_probable_external_email') &
m.email.sender_context.anyItem(item == 'is_first_email')
```

In some embodiments, alerts as to the maliciousness determination may be provided to the recipient, e.g., via the network device $228_1, \ldots, 228_N$, as a graphical user interface (GUI) dashboard 230 that is accessible on a network device $614_1$, e.g., through a dedicated software application or via a web browser. Other preventive measures may be taken including blocking the sender's email address or the sender's domain at the firewall 812, the mail client 232, and/or the server devices 236 by adding such to blocked list. When the email 608 is determined to be benign, the cyberthreat detection system 606 permits the email 608 to be transmitted to or made accessible by the recipient such as through the network device $814_1$.

In some embodiments, the prompt data store (FIG. 14) stores one or more predefined prompt scripts corresponding to each individual topic of the predefined set of topics utilized by the LDA model. Thus, when the LDA model determines that a particular topic, e.g., "Money Transfer", has a likelihood of probability of being the subject of the email body, logic of the cyberthreat detection system queries the prompt data stores for one or more prompts categorized as "Money Transfer Scam prompts." Thus, the logic will automatically generate a prompt to provide to the language model from the predefined prompt script by inserting aspects of the extracted data of the email body and subject into the prompt script.

Figure 3:
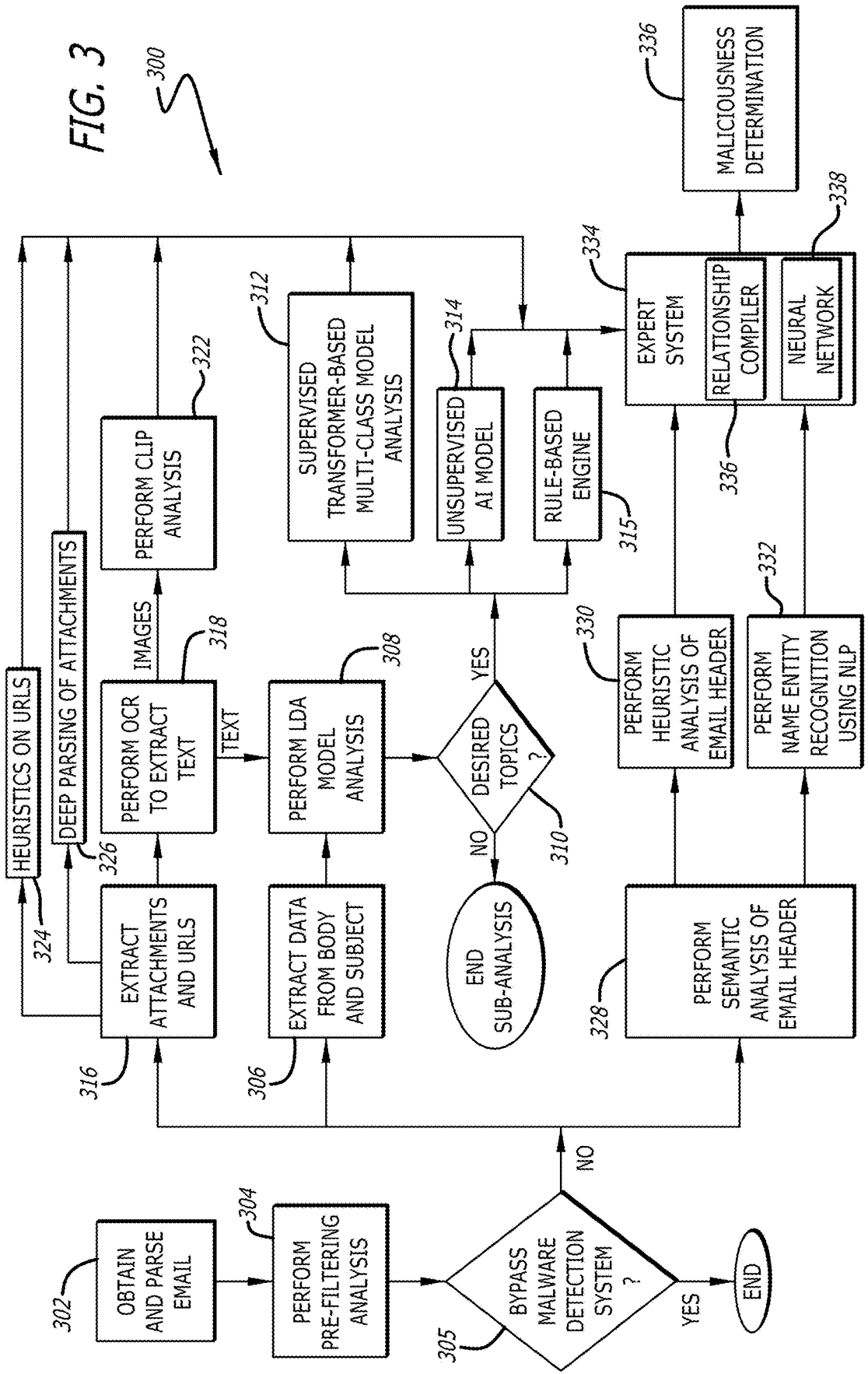
FIG. 3 is a diagrammatic flow providing a detailed example of a second implementation of the flow of FIG. 1 according to an embodiment of the disclosure.

Referring to FIG. 3, a diagrammatic flow providing a detailed example of a second implementation of the flow of FIG. 1 is shown according to an embodiment of the disclosure. The process 300 illustrates additional detail for an embodiment of the process 100 of FIG. 1. Each block illustrated in FIG. 3A represents an operation in the process 300 performed by, for example, a cyberthreat detection system 1408. It should be understood that not every operation illustrated in FIG. 3A is required. In fact, certain operations may be optional to complete aspects of the process 300. The process 300 begins with begins with obtaining and parsing an email (block 302). An email may be parsed into various sections or components as described above. Following parsing of the email, a pre-filtering analysis may be performed on the email header to make an initial determination as to whether the email should be passed through to the recipient, mail client, or merely logged as non-malicious or whether the email should proceed for further analysis (block 304). Various pre-filtering operations are described in detail above with respect to FIG. 1 and any combination of one or more may be implemented at block 304. A determination is then made as to whether the pre-filtering analysis identified the email for bypassing the rest of the cyberthreat detection system (block 305). When the email is determined to bypass the rest of the cyberthreat detection system, the email may be passed through to the recipient, mail client, or merely logged as non-malicious and the cyberthreat analysis ends.

When the email is determined to proceed with further analysis by the cyberthreat detection system, the parsed email features are then provided to one or more of the blocks 306, 316, and/or 328 in serial, in parallel, or concurrently (at least partially overlapping in time). In some embodiments, the block 306 includes an analysis of the features of the email body and subject through deployment of one or more artificial intelligence models to determine or classify the semantics of the email body or subject.

Referring to a first phase or aspect of the email analysis, data is extracted from the email body and subject line (block 306). The extracted data is provided as to a probabilistic generative model such as a LDA model (block 308). The LDA model may be configured to determine the likelihood that the email body or subject includes or is directed to each of a predefined set of topics, e.g., detect latent topics within the email. The LDA model provides the probability of each topic appearing in the email body and subject as a result of its processing.

When the LDA model determines that the email body or subject is not directed to one of a predefined list of desired topics (no at block 310), the first phase of the email analysis ends. However, when the LDA model determines that the email body or subject is directed to one of the predefined list of desired topics (yes at block 310), the topic and the extracted data is passed to one or more sub-phases including to a supervised transformer-based multi-class model (block 312), an unsupervised AI model (block 314), and/or a rule-based engine (block 315). Details as to operations of the operations of blocks 312, 314, 315 are provided below at least with respect to FIG. 4A.

Now referring to a second phase or aspect of the email analysis and in some examples, the block 316 includes extracting attachments and/or URLs of the email. Multiple operations may span from block 316, wherein a first operation includes performing an optical character recognition (OCR) process to extract text 320a (block 318), where the LDA modeling analysis is performed on the text 320a (block 308) as described above. The images 320b of the attachments are passed to a CLIP model for analysis (block 322). The CLIP model may be trained and fine-tuned to associate the images 320b with text representing corporate entities' brand names, logos, or name. Like the results of the supervised and unsupervised model analyses of blocks 312-314, the results of the CLIP model analysis are provided to the relationship compiler of block 334.

When a URL is extracted from the email, e.g., from any component of the email such as the body, an attachment, the subject, etc., heuristics may be performed on the identified URLs (block 324). Examples of heuristics include determining whether a URL is hosted on a file sharing website, includes redirects, and/or is a suspicious URL by not conforming to RFCs defining the HTTP protocol. Each heuristic may generate a feature that is also provided to the expert system 334.

Further, deep parsing of attachments extracted from the email may be performed (block 326). The deep parsing of attachments may result in the generation of features that are provided to the expert system 334. Example features may include a first feature directed to HTML file extensions (.htm or .html) and notes whether the HTML extension includes suspicious obfuscation, suspicious URLs, and/or URLs that lead to a redirect. In some examples, a URL may be deemed suspicious after an analysis of the URL and optionally the destination address when: (i) visiting the URL results in the downloading of executable files such as .zip, .exe, .vbs etc.; (ii) the URL includes redirect; (iii) the URL does not follow the RFC standards; or (iv) when the URL includes patterns which are commonly used in malicious activity. The analysis may be performed through execution of regular expressions that take the URL as input.

A second feature may be directed to ONENOTE® files (.one) and indicates whether a ONENOTE® file attachment includes any executable code. A third feature may be directed to PDF attachments (.pdf) and note whether the PDF attachment includes a suspicious URL and/or a URL leading to a redirect. A fourth feature may be directed to SVG attachments (.svg) and note whether the SVG attachment includes executable code (e.g., URLs fetching executable code, data URI, scripts, and/or onmouseover, onclick, or onload HTML tags that execute code). A fifth feature may be directed to OLE attachments (.ole) and note whether the OLE attachment includes visual basic application (VBA code), macros, or embedded OLE.

A sixth feature may be directed to EXCEL® attachments (.xls, .xlsx) and note whether the attachment includes executable code, password protected folders, or less than 10 files. A seventh feature may be directed to compressed attachments (.zip, .rar, .tar) and note whether the attachment includes VBA code. An eighth feature may be directed to whether any attachment has a file extension of (.WIM or .ZPAQ), which are unique and unusual. A ninth feature may be directed to images (.png, .jpg, etc.) and note whether the image includes text and/or embedded executable code. Additional features for which an attachment is analyzed include the presence of executable code, the presence of suspicious obfuscation code or API calls, the presence of suspicious links, including redirect links or links hosting executable, and/or the presence of suspicious URLs with a top-level domain (TLD) from a specified list (e.g., .cn or .ru).

Now referring to a third phase or aspect of the email analysis, semantic, heuristic, and/or natural language processing analyses may be performed on the email header features (block 328). The processing of the email header results in computation of certain features through including a display name, O365 headers, mail from/reply-to, sender's domain, domains, display name/allow/deny list, etc. In some embodiments, the display name may be computed through deployment of a natural language processing (NLP), such as a name entity recognition (NER) model that is configured and trained to identify and classify names/dates within the header from one or more of a predetermined list classes such as person name, organization name, location, date, etc. (block 332).

Additional features may be generated through heuristics (block 330). The O365 header feature(s) is an indication as to whether the email is the first email in the conversation (or "thread"), whether the email is an internal or external email, e.g., as it pertains to an enterprise or other corporate entity, and/or the transmission path of network traffic based on network segmentation principles such as whether the traffic is North-South (data flowing into or out of a data center) or East-West (data flowing across different components of a data center such as between servers, network device-server, network device-network device, etc.). The mail from/reply to feature is an indication as to whether a mismatch exists between the domain in the "Mail From:" and "Reply To:" email header. The sender's domain feature(s) includes whether the domain is newly registered (e.g., within a threshold number of days), whether the domain is going to expire soon (e.g., within a second threshold number of days), and/or whether the email address is a free email address. The domains feature identifies whether any URL included in the header material is a typosquatting domain. Further, the display name/allow/deny list indicates whether the name in the To: field appears on either an allow/deny list, such as provided by a corporation. Another feature may include whether a signing authority was used to verify the authenticity of a URL and another feature may include which signing authority was used. For example, use of the signing authority "letsencrypt" may be a notable feature utilized by the expert system 334 to determine maliciousness of the email.

Along with the semantic results of the operations of the blocks 304, 312, 314, 315, 322, 324, and 326, the semantic results of the blocks 330, 332 are provided to a relationship compiler 336 and, optionally, a neural network 338 of the expert system 334. In some embodiments, the relationship compiler 336 may apply a set of heuristics or other rules to determine if an attachment or URL is malicious or whether the email has been transmitted from a compromised email account, where the set of heuristics or other rules are applied to the semantic results. Additionally, or alternatively, the expert system 334 may invoke a neural network 338 configured and fine-tuned to determine whether the email is malicious, or phishing based on the parsed feature set and semantic results of one or more of the operations of the blocks 304, 312, 314, 315, 322, 324, and 326 (and any features generated during processing of any analyses proceed any of those blocks), e.g., provide a maliciousness determination (block 340).

In some embodiments, the relationship compiler 336 receives the semantic results from one or more of the blocks 304, 312, 314, 315, 322, 324, and 326 as input and implements one or more of a set of predefined rules to determine whether the email is malicious. In some embodiments, each of the predefined rules assesses one or more of the results from the blocks 304, 312, 314, 315, 322, 324, and 326 for a particular malicious feature, such as whether a URL or attachment is malicious, which would result in a determination that the email is malicious.

As one example of a predefined rule, the relationship compiler 336 may implement a rule that determines whether an email that includes a URL and attachment including an image is malicious by first extracting certain features from the results of a subset of the blocks 304, 312, 314, 322, 324, and 326 such as (i) the topics identified by the LDA model analysis (block 308) and one or more of the semantics from the supervised/unsupervised model analyses (blocks 312, 314), (ii) whether the URL is a call-to-action URL (block 304), (iii) whether the image of the attachment corresponds to a well-known brand logo based on the CLIP model analysis (block 322), (iv) information as to whether the email was the first email in the conversation (email thread) based on the heuristics performed on the email header (block 330), and (v) the email was from an external sender (e.g., sender domain not that of the enterprise domain common to the recipient). The relationship compiler 336 may then execute a rule that assesses the features in combination such that a particular combination of the features results in a determination that the email is malicious (e.g., in the example above, directed to a financial scam). One example of the combination of the features noted above that will result in a determination of maliciousness may be: (1) the URL is a call-to-action (and further a financial call-to-action based on the semantic topic modeling identifying finance as a topic of the email/attachment), (2) the image of the attachment corresponds to a well-known financial institution logo, (3) the email is the first in the email conversation, and (4) the email is from an external sender. The relationship compiler 336 may assess one or more predefined rules in the same manner discussed above such that if one or more are satisfied, the email may be determined to be malicious.

B. Sub-Analysis of Body and Subject

Figure 4A:
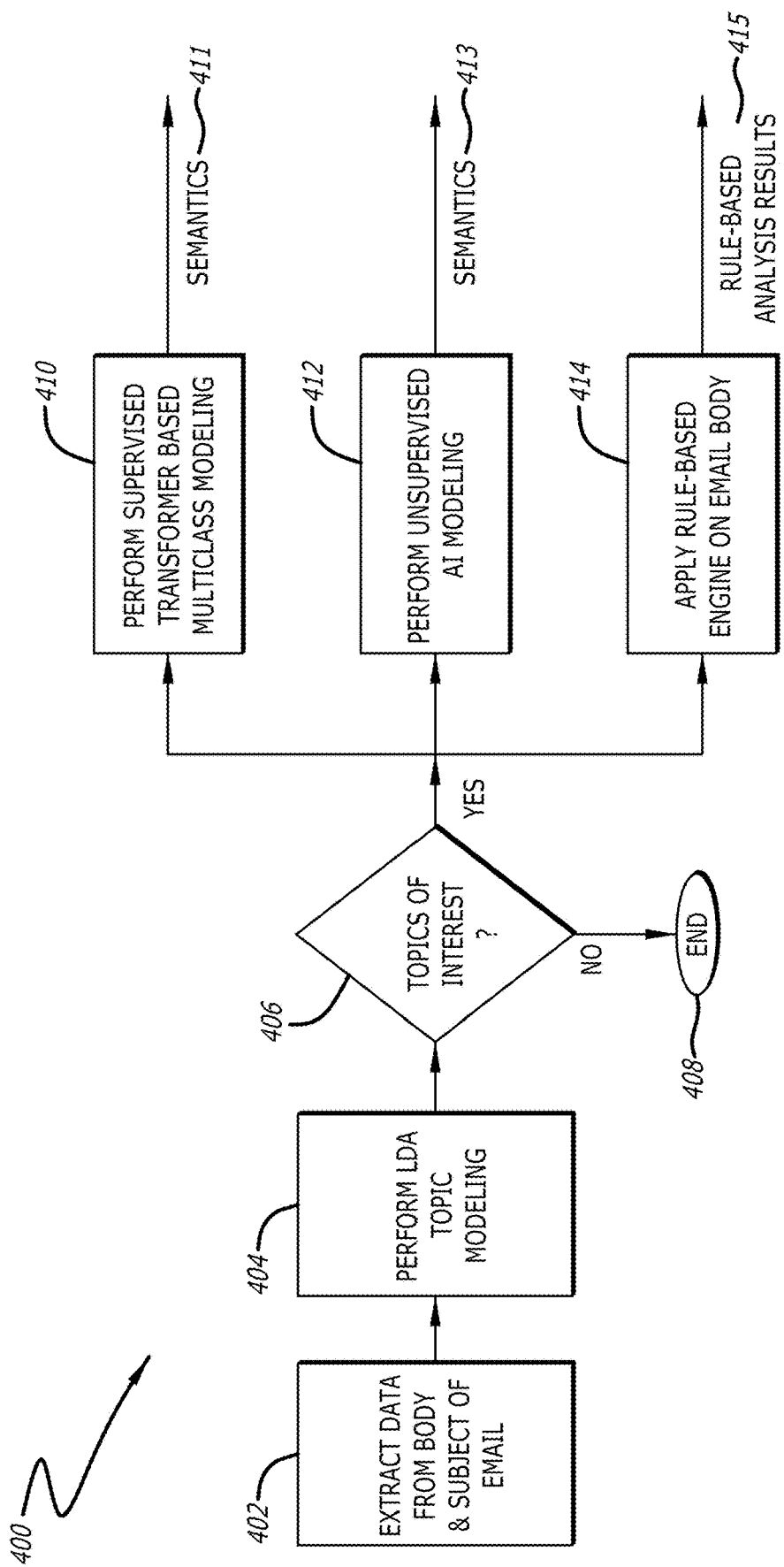
FIG. 4A is a diagrammatic flow providing detail of a first embodiment of a first phase of the methodology illustrated in FIG. 3 according to an embodiment of the disclosure.

Referring to FIG. 4A, a diagrammatic flow providing detail of a first embodiment of a first phase of the methodology illustrated in FIG. 3 is shown according to an embodiment of the disclosure. Each block illustrated in FIG. 4A represents an operation in the process 400 being a sub-analysis of the features of the email body and subject as shown in, for examples FIGS. 1-3. It should be understood that not every operation illustrated in FIG. 4A is required. In fact, certain operations may be optional to complete aspects of the process 400.

In some embodiments, the process 400 may include operations performed as part of block 106 of FIG. 1 and the set of operations beginning with block 306 of FIG. 3. More specifically, the process 400 provides additional details of the analysis of the features of the email body and subject through deployment of a probabilistic generative model, e.g., an LDA model, and, if warranted, deployment of one or more artificial intelligence models to determine or classify the semantics of the email body or subject based on the LDA model analysis. The process 400 begins with the assumption that an email for analysis has been received or retrieved and has been parsed into various sections or components as described above.

Data, e.g., text, is extracted from the body and subject of the email and provided to a LDA model (blocks 402, 404). As noted above, the LDA model is configured to determine the likelihood that the email includes or is directed to each of a predefined set of topics, e.g., detect latent topics within the email. As described above, the LDA model processes the extracted data from the body and subject of the email resulting in the probability of each topic appearing in the email.

When the email does not include and is not directed to a topic appearing on a list of desired topics, e.g., the likelihood determined by the LDA model for each topic does not satisfy a threshold comparison (no at block 406), the process 400 ends (block 408). In some examples, the threshold comparison of block 406 may indicate that the likelihood for each topic does not meet or exceed a threshold. However, when the email is determined to include or be directed to a topic appearing on a list of desired topics (yes at block 406), one or more additional analysis may be performed on the data extracted from the body and subject of the email including supervised transformer-based multiclass modeling (block 410), unsupervised AI modeling (block 412), and/or application of a rule-based engine (block 414).

In some embodiments, the supervised transformer-based multiclass modeling (block 410) may include deployment of fine-tuned language models, which are configured to determine a deeper meaning of emails, e.g., semantics. Examples of supervised transformer-based multiclass models that may be used include Phi-2, DistilBERT, and Llama. The supervised transformer-based multiclass model is fine-tuned and configured to receive input data (e.g., text from the email body and subject) and provide an output being a classification of the input data into one of a predefined set of classes, where the classes represent semantics of the email, which are based on intentions of cyber-attackers. Examples of predefined classes may include: "Invoice requesting a call for action"; "Financial emails requesting call for action"; "Official emails requesting call for action"; "Informational email requesting call for action"; "Logistical emails requesting call for action"; "Promotional email requesting call for action"; "Login/credential emails requesting to enter passwords"; etc. The output of the supervised transformer-based multiclass model may include a vector of numbers representing the likelihood that the email is to be classified as any of the predefined classes, e.g., the vector may comprise a set of decimals such as 0.80 for a particular topic representing a determination that there's an 80% likelihood that the email is directed to the particular topic. The semantic result from block 312 may include a combination of the correlation of numbers within the vector with the corresponding topic when the number exceeds a confidence threshold, e.g., "the email is or includes an invoice requesting a call for action," when the likelihood that the email belongs to the class "Invoice requesting a call for action" as determined by the supervised transformer-based multiclass model meets or exceeds a confidence threshold.

In many embodiments, deployment of a supervised transformer-based multiclass model includes tokenizing the input data, such as the text from the email body and subject, based on a fixed-size vocabulary resulting in a vector representation, which may be performed through a word embedding process, e.g., with a known algorithm such as Word2Vec or GloVe). The supervised transformer-based multiclass model includes a stack of transformer layers, which receives and processes the tokenized input data to capture dependencies within the tokenized input data. One or more fully-connected layers and an activation function obtain the output from the transformer layers and determine a probability distribution over the set of predefined classes, where the class having the highest probability is selected as the predicted class for the input data.

In some embodiments, the unsupervised AI modeling (block 412) may be configured to perform hierarchical topic modeling and establish parent-child relationships between a plurality of topics as determined by the LDA topic modeling. For example, when the LDA topic modeling determines an email is directed to two topics, e.g., "invoice" and "call for action," the hierarchical topic modeling processes the email body and topic indicators to identify "invoice" as the parent topic and "call for action" as its child. This hierarchical structure signifies that "call for action" is associated with the "invoice" topic, which aids in understanding the underlying semantics. Examples of hierarchical topic modeling include Hierarchical Latent Dirichlet Allocation (hLDA), Hierarchical Dirichlet Process (HDP), Nested Chinese Restaurant Process (nCRP), Structural Topic Modeling (STM), and Dynamic Topic Models (DTM).

Additionally, in some embodiments, application of a rule-based engine may include performing heuristics on the text of the email body or subject (block 414). Examples of heuristics include determining whether specific phrases or terms are used in the text, e.g., the presence of titles such as "Chief Executive Officer (CEO)" or "President". Each heuristic may generate a feature that is also provided to the relationship compiler of block 334.

An example set of predefined topics may include: invoice; financial; official; informational; logistical; call-to-action; auto-reply; credential; promotional; evaluation; sense of urgency; and secure attachment. An example LDA model may be trained and configured to detect predefined groupings of words that correspond to a larger topic; thus, a topic may be defined by a grouping of words. An example of such groupings of words may include: (i) 'invoice': ['bill', 'invoice', 'order', 'payment', 'purchase', 'receipt', 'ref', 'reference', 'transaction', 'sales', 'sale', 'slip']; (ii) 'financial': ['account', 'bank', 'banking', 'credentials', 'draft', 'charge', 'deposit', 'finance', 'interest', 'money', 'instrument', 'outstanding', 'payroll', 'refund', 'swift', 'transfer', 'wire', 'statement', 'withdraw', 'atm', 'remittance', 'RFQ', 'investment']; (iii) 'official': ['advance', 'advice', 'appraisal', 'circular', 'collection', 'contract', 'cutoff', 'deadline', 'instruction', 'form', 'inquiry', 'instruction', 'notification']; (iv) 'informational': ['attention', 'attached', 'attachment', 'attentive', 'awareness', 'caller', 'communication', 'confidential', 'document', 'efax', 'fax', 'memo', 'office', 'scan', 'shared', 'survey', 'voice', 'RFP', 'RFI']; (v) 'logistical': ['batch', 'consignment', 'container', 'courier', 'dhl', 'distribution', 'drive', 'fedex', 'parcel', 'shipment']; 'call_to_action': ['action', 'now', 'buy', 'call', 'change', 'check', 'click', 'complete', 'confirm', 'claim', 'connect', 'donate', 'download', 'follow', 'get started', 'join', 'review', 'open', 'update', 'upgrade', 'verify', 'subscribe', 'sign', 'start', 'share']; 'auto_reply': ['automatic', 'undeliverable', 'unsubscribe']; 'credential': ['password', 'login', 'credential']; 'promotional': ['discounted', 'discount'], 'evaluation': ['review', 'feedback', 'survey'], 'sense_of_urgency': ['urgently', 'asap', 'ASAP'], 'secure_attachment': ['password'].

Figure 4B:
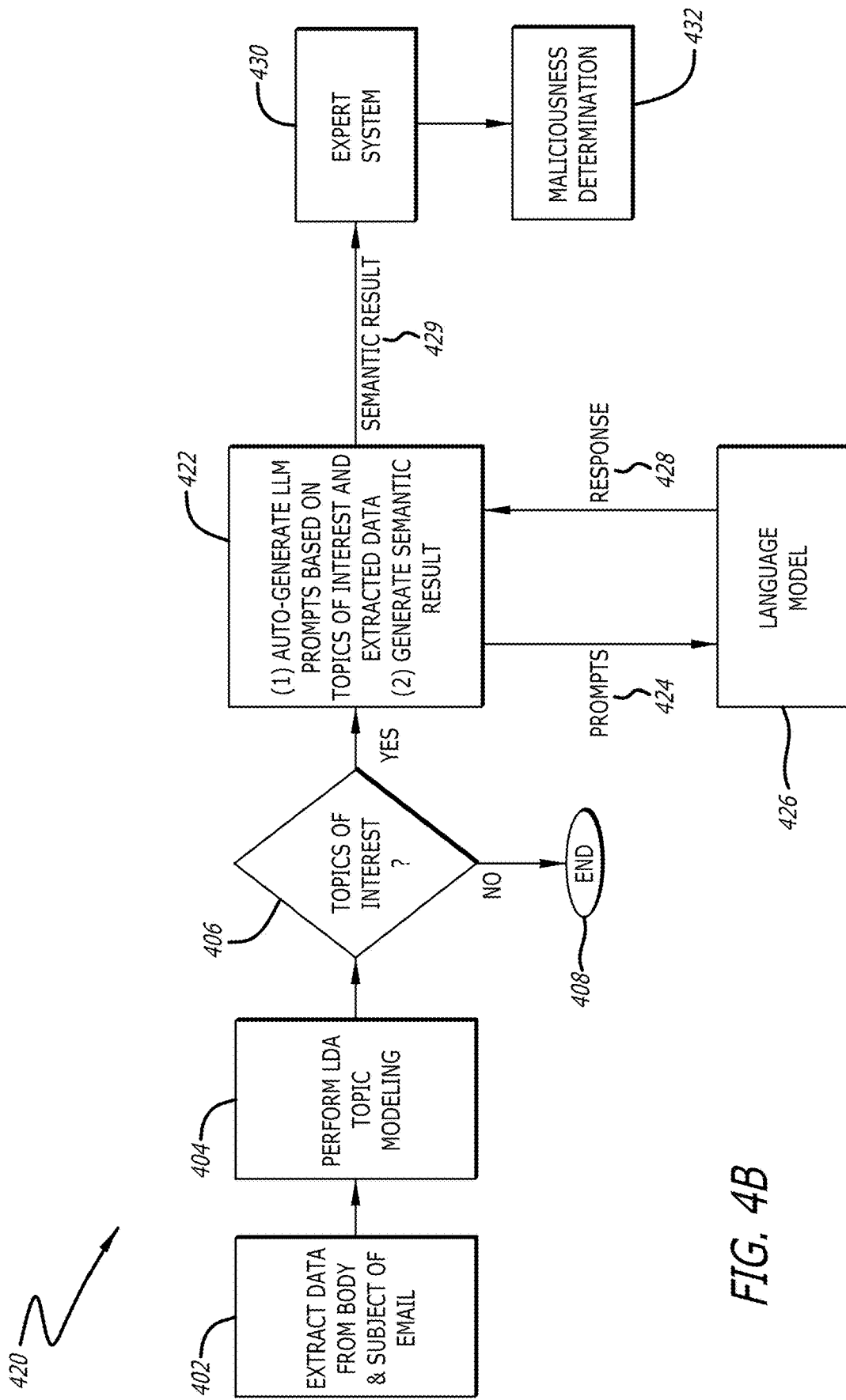
FIG. 4B is a diagrammatic flow providing detail of a second embodiment of a first phase of the methodology illustrated in FIG. 3 according to an embodiment of the disclosure.

Referring now to FIG. 4B, a diagrammatic flow providing detail of a second embodiment of a first phase of the methodology illustrated in FIGS. 2-3 is shown according to an embodiment of the disclosure. Each block illustrated in FIG. 4B represents an operation in the process 420 being a sub-analysis of the features of the email body and subject as shown in, for examples FIGS. 1-3. It should be understood that not every operation illustrated in FIG. 4B is required. In fact, certain operations may be optional to complete aspects of the process 420. In some embodiments, the process 420 may include operations performed as part of block 106 of FIG. 1 and the set of operations beginning with block 306 of FIG. 3. More specifically, the process 420 provides additional details of an analysis of the features of the email body and subject through prompt generation and language model deployment as shown in FIG. 2. The process 420 begins with the assumption that an email for analysis has been received or retrieved and has been parsed into various sections or components as described above.

Data, e.g., text, is extracted from the body and subject of the email and provided to a LDA model, which processes the extracted data to determine a probability that the extracted data of the email body and subject is directed to each topic of a set of predefined topics (blocks 402, 404). When the email does not include and is not directed to a topic appearing on a list of desired topics (no at block 406), the process 420 ends (block 408). However, when the email is determined to include or be directed to a topic appearing on a list of desired topics (yes at block 406), one or more language model prompts are generated based on the topic(s) of interest and extracted data (block 422).

In some embodiments, one or more prompts may be automatically generated based on the extracted data and a single topic determined by the LDA model as being the topic having the greatest probability of being included in or to which the email body and subject is directed. For example, the cyberthreat detection system 1408 (see FIG. 14) may include logic configured to receive one or more topics and retrieve one or more predefined prompt scripts from a prompt data store such as the prompt data store 1486 of FIG. 14. The logic may be configured to insert components of the email body and subject into a predefined prompt script and transmit the completed prompt 424 to a language model (block 426). The language model in turn processes the prompt 424 and returns a response 428, from which a zero-shot semantic result 429 of the email body and subject is generated (block 422). The semantic result 429 is provided to an expert system 430 for further processing or analysis leading to a maliciousness determination 432.

In some embodiments, the prompt data store (FIG. 14) stores one or more predefined prompt scripts corresponding to each individual topic of the predefined set of topics utilized by the LDA model. Thus, when the LDA model determines that a particular topic, e.g., "Money Transfer", has a likelihood of probability of being the subject of the email body, logic of the cyberthreat detection system queries the prompt data stores for one or more prompts categorized as "Money Transfer Scam prompts." Thus, the logic will automatically generate a prompt to provide to the language model from the predefined prompt script by inserting aspects of the extracted data of the email body and subject into the prompt script.

An illustrative example of content provided to a language model 426 is as follows, where a topic of the email as determined by the LDA topic modeling is, "Invoice": (1) the body of email, and (2) the prompt, "Are the semantics related to the invoice associated with a call for action?" The language model 426, e.g., open-source language models such as LLAMA 3, or closed-source models, provides a response 428 ("Yes" or "No"). Logic, such as the body/subject analysis logic 1440 of FIG. 14 may then assemble the semantics result 429 based on the prompt and response, e.g., "The semantics of the email relate to an invoice with a call for action," where the semantics result 429 may include email body and subject.

Additional examples of prompts for various topics include:
- "financial": ["Is semantics related to financial transactions or financial matter or has a financial context such as payment request, payment confirmation, payment receipt, investment opportunity, loan approvals, loan information, taxation notices, taxation refund, debt relief, debt offer, providing grant, providing aid, attached financial statement"],
- "informational": ["Is the semantics aim to inform the recipient about a specific event, status update, or requirement related to their account, transaction, or activity, including notifications, updates, and confirmations"],
- "promotional": ["Is semantics related to promotional offer"],
- "logistical": ["Is semantics related to convey information about logistical and delivery process."],
- "evaluation": ["Is the semantics related to evaluating performance or assessing satisfaction, or gathering feedback on the quality of a product, service, or experience"],
- "official": ["Is the semantics related to an official communication"],
- "credential": ["Is the semantics related to credential aimed to protect online accounts by verifying and updating user identities, login credentials, and account information"],
- "digital_communication": ["Is the semantic explicitly related to a call to action for an attachment generated by VOIP, e-fax, scanner or attachment is a voicemail message?"].

C. Sub-Analysis of Attachments and URLs

Figure 5:
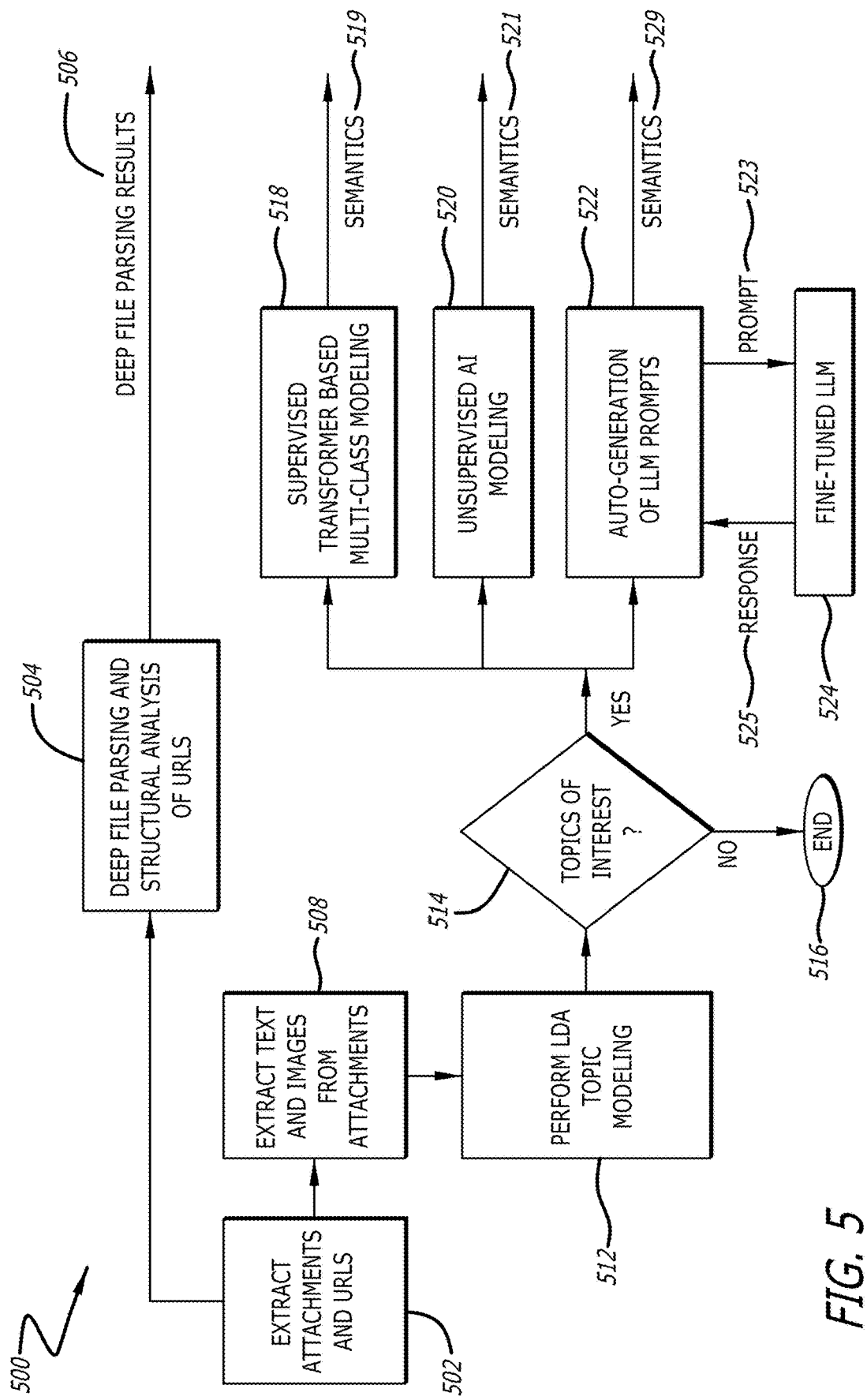
FIG. 5 is a diagrammatic flow providing detail of a second phase of the methodology illustrated in FIG. 3 according to an embodiment of the disclosure.

Referring to FIG. 5, a diagrammatic flow providing detail of a second phase of the methodology illustrated in FIG. 3 is shown according to an embodiment of the disclosure. Each block illustrated in FIG. 5 represents an operation in the process 500 being a sub-analysis of attachments and URLs attached to or included in the body of an email as shown in, for examples FIGS. 1-3. It should be understood that not every operation illustrated in FIG. 5 is required. In fact, certain operations may be optional to complete aspects of the process 500. In some embodiments, the process 500 may include operations performed as part of block 108 of FIG. 1 and the set of operations beginning with block 316 of FIG. 3. More specifically, the process 500 provides additional details of an analysis of attachments attached to the email and URLs included in the email body or subject line. The process 500 begins with the assumption that an email for analysis has been received or retrieved and has been parsed into various sections or components as described above.

A first operation of the process 500 includes extracting any attachments from the email under analysis and any URLs included in the email body, subject line, and/or attachments (block 502). While multiple analysis paths branch off of the block 502, a first analysis path includes performing deep file parsing of attachments and structural analysis of any URLs (block 504), which results in deep file parsing results 506. In addition to possible features extracted during deep file parsing, results of the deep file parsing analysis may indicate whether the attachment includes one or more of embedded executable code, macros, visual basic (VB) script, JAVASCRIPT® code, suspicious API calls, obfuscation, redirect links, server message block (SMB) protocol links, links to download executables such as .vbs, .msi, .lnk, .exe, .bat, .hta, .jse, .wsf, .scr, etc.

Subsequently, text and images are extracted from any attachments of the email (block 508). In some examples, optical character recognition may be performed to detect text within any images. The text is provided to an LDA model, which processes the extracted data to determine a probability that the extracted data of the email body and subject is directed to each topic of a set of predefined topics (block 512, 514). When the email does not include and is not directed to a topic appearing on a list of desired topics (no at block 514), the process 500 ends (block 516).

However, when the email does include or is directed to a topic appearing on the list of desired topics (yes at block 514), the text and topic(s) are provided to a supervised transformer based multi-class model (block 518) and/or an unsupervised AI model (block 520). Blocks 518-520 include operations similar to those discussed above with respect to blocks 410-412 of FIG. 4A. Additionally, as an alternative to the application of a rule-based engine (block 414 of FIG. 4A), the process 500 includes automated generation of one or more language model prompts (block 522) where the prompt(s) s 523 are provided to a langue model 524 for processing. A semantic result 529 may be generated based on the prompt 523 and response 525, where the semantic result 529 is provided to an expert system (see FIG. 2).

Additionally, images may be extracted from the attachments passed to a CLIP model for analysis (block 526). As noted above, a CLIP model may be trained and fine-tuned to associate the images with text representing corporate entities' brand names, logos, or name. Like the results 519, 521 of the supervised and unsupervised model analyses of blocks 518, 520, respectively, the results of the CLIP model analysis (results 527) are provided to the expert system.

III. Deployment Configurations and Architectures

D. First Example Architecture

Figure 6:
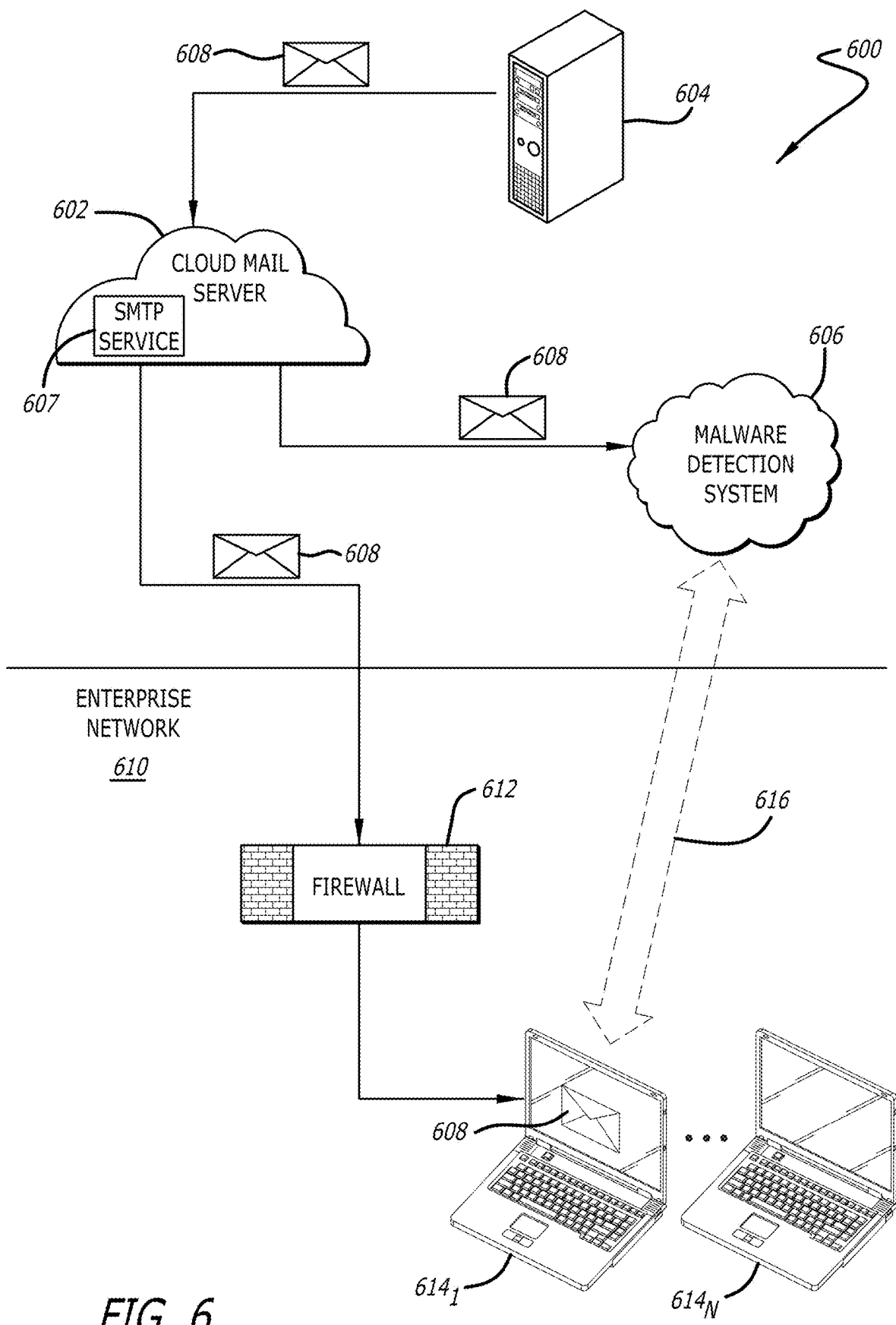
FIG. 6 illustrates a first architectural deployment of networked components configured to implement the diagrammatic flow of FIG. 1 according to an embodiment of the disclosure.

Referring to FIG. 6, a first architectural deployment of networked components configured to implement the diagrammatic flow of FIG. 1 is shown according to an embodiment of the disclosure. FIG. 6 illustrates a networked environment 600 including a plurality of networking components, e.g., electronic computing devices configured for exchanging of network traffic, including a cloud mail server, a compromised server that may be controlled by a cyber attacker and a cyberthreat detection system 606. Additionally, the networked environment 600 may also include a private network 610 such as an enterprise network that includes a firewall 612 that is configured to control the transmission of network traffic to and from network devices connected to the enterprise network 610 such as the network devices (endpoints) $614_1, \ldots, 614_N$ (where N≥1).

It may be understood that FIG. 6 illustrates that the cyberthreat detection system 606 is deployed on cloud computing resources such as a plurality of server devices comprising non-transitory computer-readable medium and a plurality of processors. Additionally, the cloud mail server 602 may be, for example, MICROSOFT® OFFICE365® mail server. In some embodiments, the cyberthreat detection system 606 may execute a Simple Mail Transfer Protocol (SMTP) service 607 for each tenant, e.g., each email account, where the SMTP service 607 for a particular tenant is configured to receive emails for the particular tenant at the cloud mail server 602 and provide a copy of the email to the cyberthreat detection system 606 while the email is also passed along or accessible to one or more network devices $614_1$-$614_N$ that access the corresponding email account.

An illustrative example follows with reference to FIG. 6. A compromised server 604 transmits an email 608 to the cloud mail server 602 directed to an email account that is accessible by the network device $614_1$ (e.g., the email account is logged into to a mail client at the network device $614_1$). The SMTP service running at the cloud mail server 602 passes along a copy of the email 608 to the cyberthreat detection system 606 while a copy is also passed to the network device $614_1$. The email 608 passes through the firewall 612 and may be intercepted in some instances for initial pre-processing. FIG. 6 shows that the email 608 was passed from the firewall 612 to the network device $614_1$. The cyberthreat detection system 606 performs analyses in accordance with the disclosure above to determine whether the email 608 is malicious. When the email 608 is determined to be malicious, the cyberthreat detection system 606 utilizes a retrospective API 616 to pull the email 608 from the inbox of the mail client running on the network device $614_1$. When the email 608 is determined to be benign, the cyberthreat detection system 606 permits the email 608 to remain in the inbox.

Figure 7:
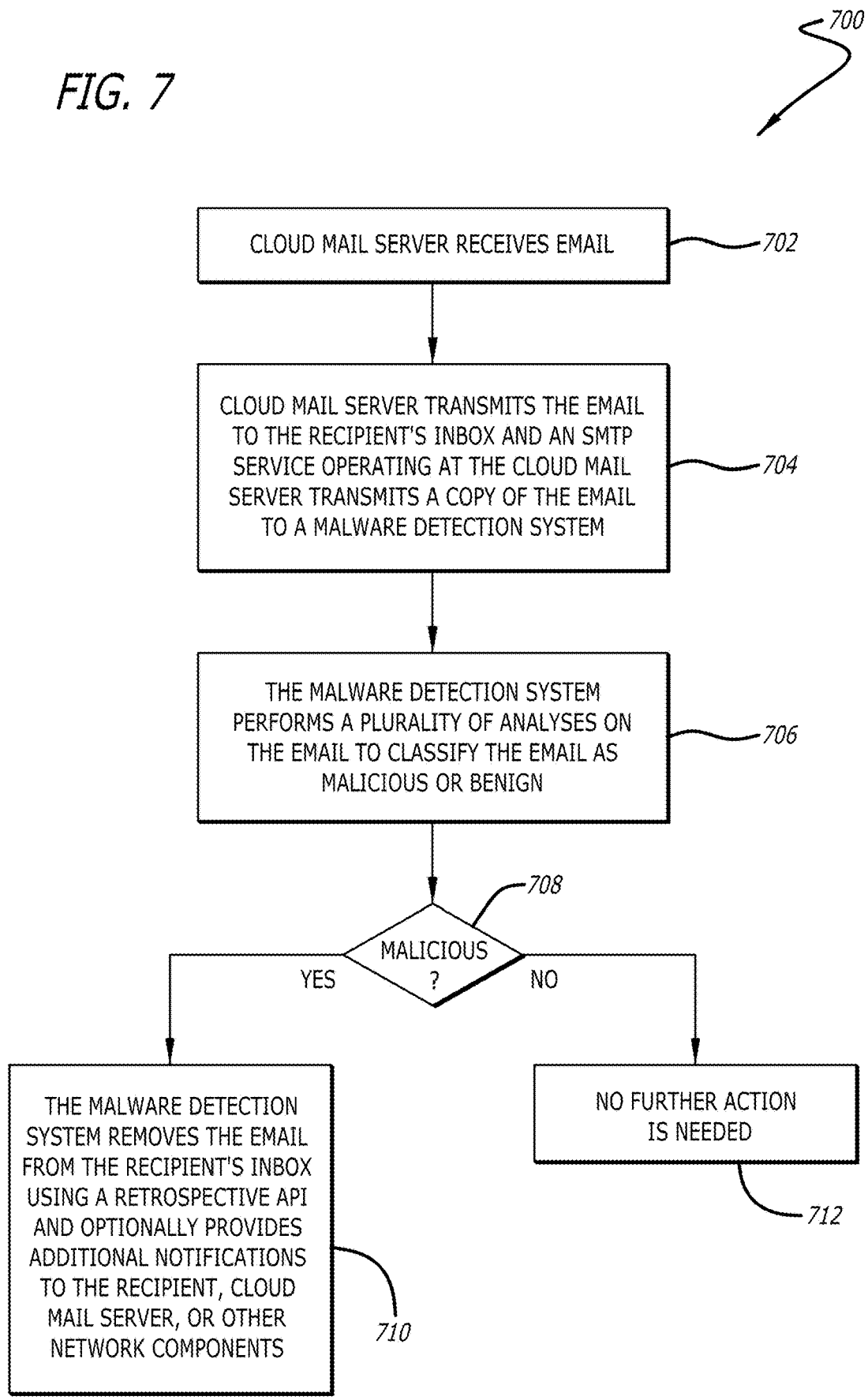
FIG. 7 illustrates a flowchart of a process for detecting malicious or phishing network communications by network components deployed according to the architecture of FIG. 6 according to an embodiment of the disclosure.

Referring to FIG. 7, a flowchart of a process for detecting malicious or phishing network communications by network components deployed according to the architecture of FIG. 6 is shown according to an embodiment of the disclosure. Each block illustrated in FIG. 7 represents an operation in the process 700 performed by, for example, a cyberthreat detection system 1408 of FIG. 14. It should be understood that not every operation illustrated in FIG. 7 is required. In fact, certain operations may be optional to complete aspects of the process 700. The process 700 begins with an email being received by a cloud mail server (block 702). For example, the email may be received by a third-party that is not listed on an "allow list"; thus, the maliciousness of the email is unknown. The process 700 continues with the cloud mail server transmitting the email to the recipient's inbox of a mail client operating on a network device and an SMTP service operating at the cloud mail server transmitting a copy of the email to a cyberthreat detection system (block 704). In some deployments, the cyberthreat detection system may be operating on cloud computing resources or on a network device (e.g., endpoint device) of the recipient.

Subsequently, the cyberthreat detection system performs a plurality of analyses on the email to classify the email as malicious or benign in accordance with this disclosure (block 706). When the email is determined to be malicious (yes at block 708), the cyberthreat detection system removes the email from the recipient's inbox using a retrospective API and optionally provides additional notifications to the recipient, cloud mail server, or other network components (block 710.) In many embodiments, when the email is determined to be benign (no at block 708), no further action is needed. In some instances, when the email is benign, an approval instruction may be provided to the mail client and a visual indicator may appear alongside the email indicating that the cyberthreat detection system has found the email to be benign. For example, a checkmark or other indicator may appear in a preview of the email in inbox or in the email itself.

E. Second Example Architecture

Figure 8:
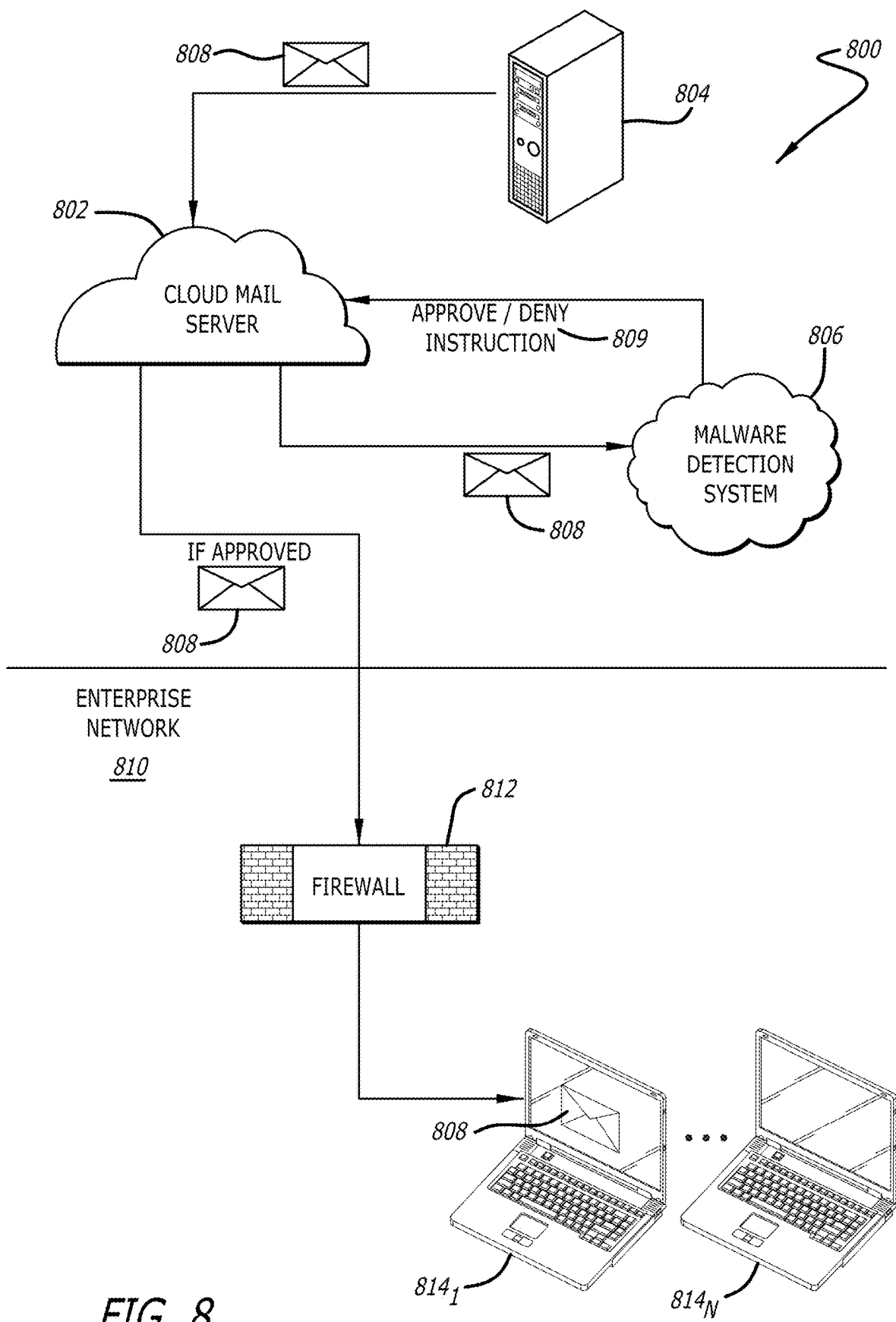
FIG. 8 illustrates a second architectural deployment of networked components configured to implement the diagrammatic flow of FIG. 1 according to an embodiment of the disclosure.

Referring to FIG. 8, a second architectural deployment of networked components configured to implement the diagrammatic flow of FIG. 1 is shown according to an embodiment of the disclosure. FIG. 8 illustrates a networked environment 800 including a plurality of networking components, e.g., electronic computing devices configured for exchanging of network traffic, including a cloud mail server, a compromised server that may be controlled by a cyber attacker and a cyberthreat detection system 806. Additionally, the networked environment 800 may also include a private network 810 such as an enterprise network that includes a firewall 812 that is configured to control the transmission of network traffic to and from network devices connected to the enterprise network 810 such as the network devices (endpoints) $814_1, \ldots, 814_N$ (where N≥1).

It may be understood that FIG. 8 illustrates that the cyberthreat detection system 806 is deployed on cloud computing resources such as a plurality of server devices comprising non-transitory computer-readable medium and a plurality of processors. Additionally, the cloud mail server 802 may be, for example, MICROSOFT® OFFICE365® mail server. In some embodiments, the cyberthreat detection system 806 may be deployed as a plug-in application to the cloud mail server 802. For instance, the cyberthreat detection system 806 may be communicatively coupled to the cloud mail server 802 to retrieve (either via push/pull operations) emails received at the cloud mail server 802 prior to transmission of the emails or making such accessible to one or more network devices $814_1$-$814_N$. The cyberthreat detection system 806 performs analyses in accordance with the disclosure above to determine whether the email 808 is malicious. When the email 808 is determined to be malicious, the cyberthreat detection system 806 may prevent the email 808 from being transmitted or made accessible to a user. In some embodiments, the cyberthreat detection system 806 may place the email 808 is a SPAM folder of the mail client processing on the network device $614_1$. In other embodiments, alerts may be provided to the recipient, e.g., via the network device $614_1$, as a graphical user interface (GUI) dashboard that is accessible on a network device $614_1$, e.g., through a dedicated software application or via a web browser. Other preventive measures may be taken including blocking the sender's email address or the sender's domain at the firewall 812 by adding such to blocked list. When the email 608 is determined to be benign, the cyberthreat detection system 606 permits the email 608 to be transmitted to or made accessible by the recipient such as through the network device $814_1$.

Figure 9:
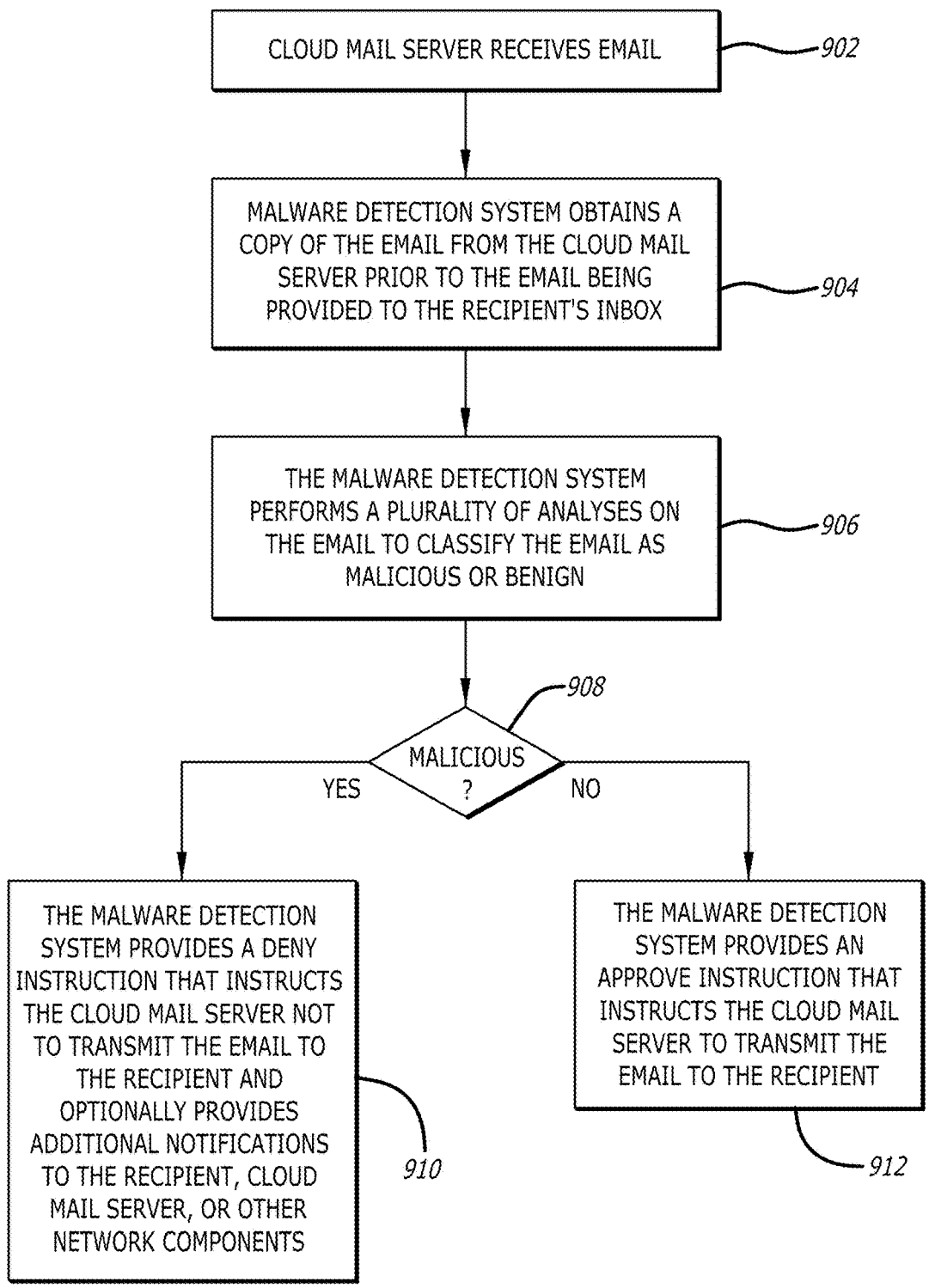
FIG. 9 illustrates a flowchart of a process for detecting malicious or phishing network communications by network components deployed according to the architecture of FIG. 8 according to an embodiment of the disclosure.

Referring to FIG. 9, a flowchart of a process for detecting malicious or phishing network communications by network components deployed according to the architecture of FIG. 8 is shown according to an embodiment of the disclosure. Each block illustrated in FIG. 9 represents an operation in the process 900 performed by, for example, a cyberthreat detection system 1408 of FIG. 14. It should be understood that not every operation illustrated in FIG. 9 is required. In fact, certain operations may be optional to complete aspects of the process 900. The process 900 begins with an email being received by a cloud mail server (block 902). For example, the email may be received by a third-party that is not listed on an "allow list"; thus, the maliciousness of the email is unknown. The process 900 continues with the cyberthreat detection system obtaining a copy of the email from the cloud mail server prior to the email being provided to the recipient's inbox (block 904). The cyberthreat detection system may obtain the email via pull/push operations. In various deployments, the cyberthreat detection system may be operating on cloud computing resources or on a network device (e.g., endpoint device) of the recipient.

Subsequently, the cyberthreat detection system performs a plurality of analyses on the email to classify the email as malicious or benign in accordance with this disclosure (block 906). When the email is determined to be malicious (yes at block 908), the cyberthreat detection system provides a deny instruction that instructs the cloud mail server not to transmit the email to the recipient and optionally provides additional notifications to the recipient, cloud mail server, or other network components and optionally provides additional notifications to the recipient, cloud mail server, or other network components (block 910.) In many embodiments, when the email is determined to be benign (no at block 908), the cyberthreat detection system provides an approve instruction that instructs the cloud mail server to transmit the email to the recipient (block 912). Optionally, the approve instruction may instruct the mail client to place a visual indicator appear alongside the email indicating that the cyberthreat detection system has found the email to be benign. For example, a checkmark or other indicator may appear in a preview of the email in inbox or in the email itself.

F. Third Example Architecture

Figure 10:
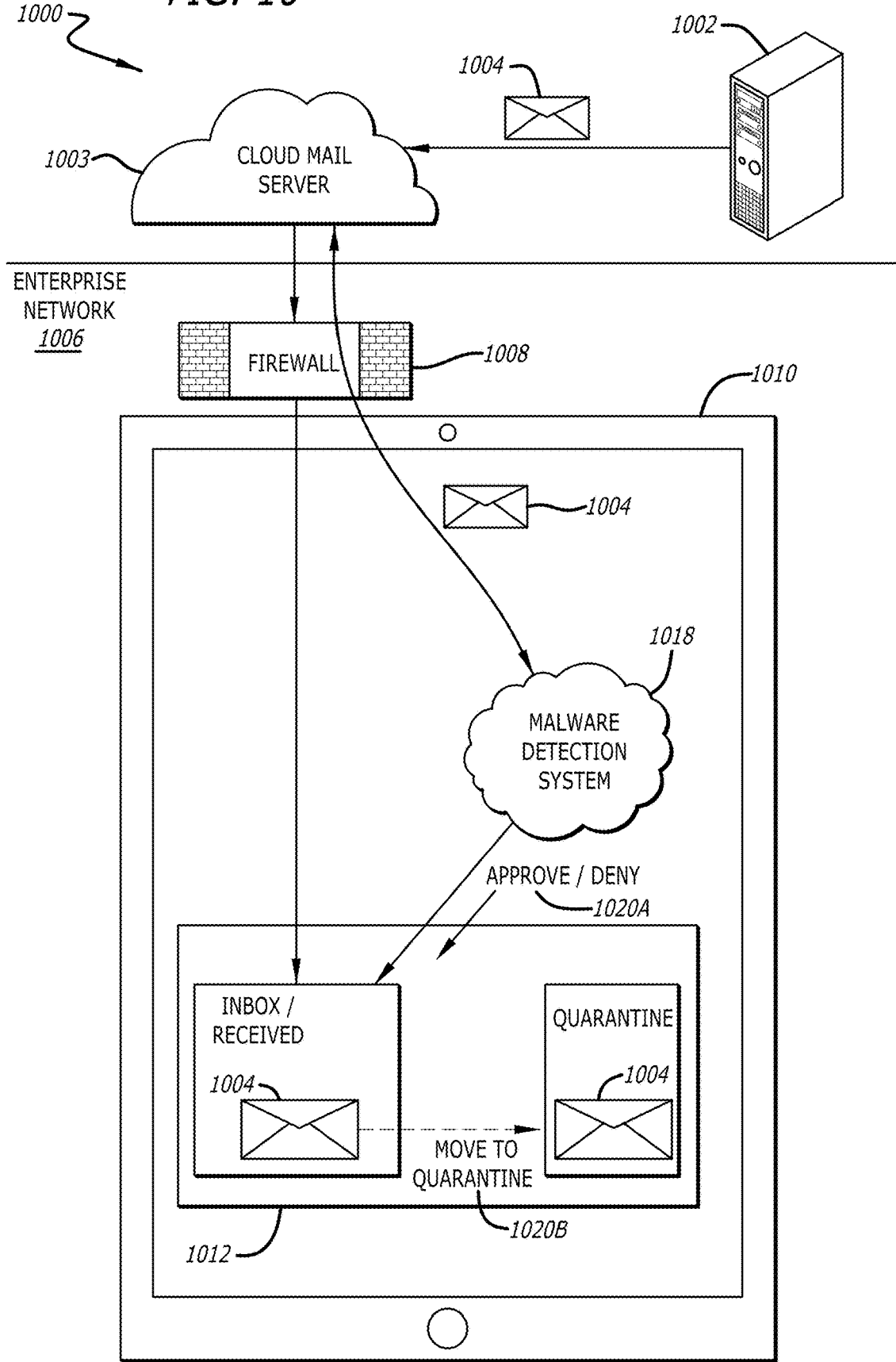
FIG. 10 illustrates a third architectural deployment of networked components configured to implement the diagrammatic flow of FIG. 1 according to an embodiment of the disclosure.

Referring to FIG. 10, a third architectural deployment of networked components configured to implement the diagrammatic flow of FIG. 1 is shown according to an embodiment of the disclosure. FIG. 10 illustrates a networked environment 1000 including a plurality of networking components, e.g., electronic computing devices configured for exchanging of network traffic, including a compromised server 1002 that may be controlled by a cyber attacker and a cloud mail server 1003. Additional network components are shown in FIG. 1000 operating within a private (enterprise) network 1006, such as a firewall 1008 that is configured to control the transmission of network traffic to and from network devices connected to the enterprise network 1006 such as the network device (endpoint) 1010.

FIG. 10 illustrates that the cyberthreat detection system 1018 is deployed on the endpoint 1010, e.g., processing on computing resources such non-transitory computer-readable medium and one or more processors of the endpoint 1010. Additionally, a mail client 1012 is shown as also processing on the computing resources of the endpoint 1010, where the mail client 1012 may be, for example, MICROSOFT® OUTLOOK®. The cyberthreat detection system 1018 may be communicatively coupled to the mail client 1012 and the cloud mail server 1003 and exchange data via internet message access protocol (IMAP). Through IMAP exchanges, the cyberthreat detection system 1018 queries the cloud mail server 1003 to retrieve emails, such as the email 1004. The cyberthreat detection system 1018 performs analyses in accordance with the disclosure above to determine whether the email 1004 is malicious and may provide an approve/deny instruction 1020A to the mail client 1012. When the email 1004 is determined to be malicious, the cyberthreat detection system 1018 may automatically move the email 1004 from an inbox folder (or sub-folder) to a quarantine folder of the mail client 1012 (optional step 1020B). The "quarantine folder" may be understood to be a secondary folder that indicates the electronic message has been classified as malicious and need not be labeled or titled "quarantine." Other labels or titles include, "Spam," "Junk," "Trash," etc.

The cyberthreat detection system 1028 and/or the mail client 1020 need not take any action when the email 1004 is determined to be benign. In some instances, the cyberthreat detection system 1018 may lock the email 1004 preventing a user from opening the email. In other instances, the cyberthreat detection system 1018 may automatically delete the email 1004 either by placing the email 1004 in a deleted/trash folder or by permanently deleting the email 1004. In some embodiments, the cyberthreat detection system 1018 may perform or cause performance of other actions such as those discussed above, e.g., with respect to at least FIGS. 2 and 8.

Figure 11:
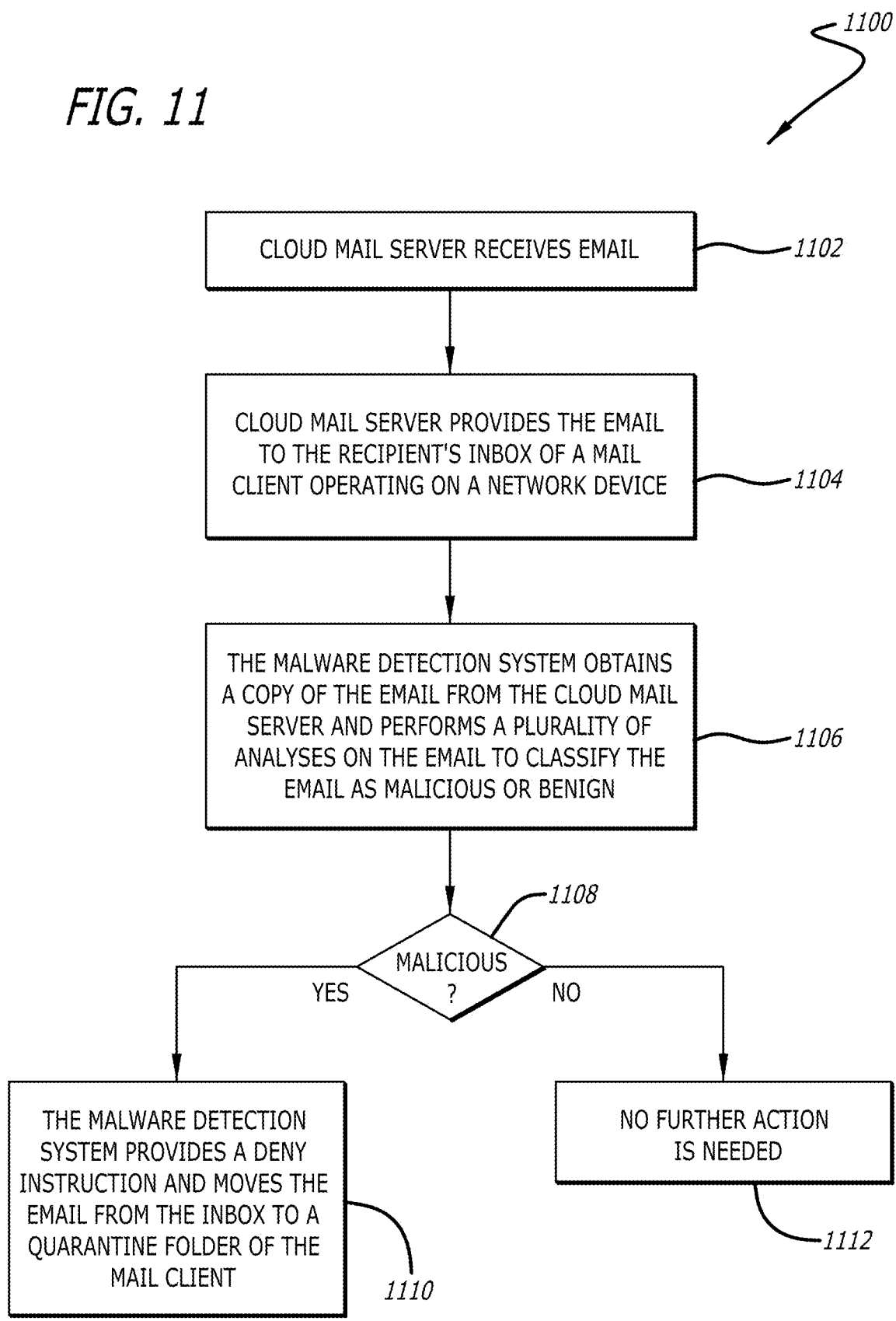
FIG. 11 illustrates a flowchart of a process for detecting malicious or phishing network communications by network components deployed according to the architecture of FIG. 10 according to an embodiment of the disclosure.

Referring to FIG. 11, a flowchart of a process for detecting malicious or phishing network communications by network components deployed according to the architecture of FIG. 10 is shown according to an embodiment of the disclosure. Each block illustrated in FIG. 11 represents an operation in the process 1100 performed by, for example, a cyberthreat detection system 1408 of FIG. 14. It should be understood that not every operation illustrated in FIG. 11 is required. In fact, certain operations may be optional to complete aspects of the process 1100. The process 1100 begins with an email being received by a cloud mail server (block 1102). For example, the email may be received by a third-party that is not listed on an "allow list"; thus, the maliciousness of the email is unknown. The cloud mail server provides the email to the recipient's inbox of a mail client operating on a network device and the cyberthreat detection system obtains a copy of the email from the cloud mail server and performs a plurality of analyses on the email to classify the email as malicious or benign in accordance with this disclosure (blocks 1104, 1106).

When the email is determined to be malicious (yes at block 1108), the cyberthreat detection system provides a deny instruction and moves the email from the inbox to a quarantine folder of the mail client and optionally provides additional notifications to the recipient, cloud mail server, or other network components and optionally provides additional notifications to the recipient, cloud mail server, or other network components (block 1110.) In many embodiments, when the email is determined to be benign (no at block 1108), no further action is needed (block 1112). As with other embodiments and configurations discussed above, optionally, the approve instruction may instruct the mail client to place a visual indicator appear alongside the email indicating that the cyberthreat detection system has found the email to be benign. For example, a checkmark or other indicator may appear in a preview of the email in inbox or in the email itself.

G. Fourth Example Architecture

Figure 12:
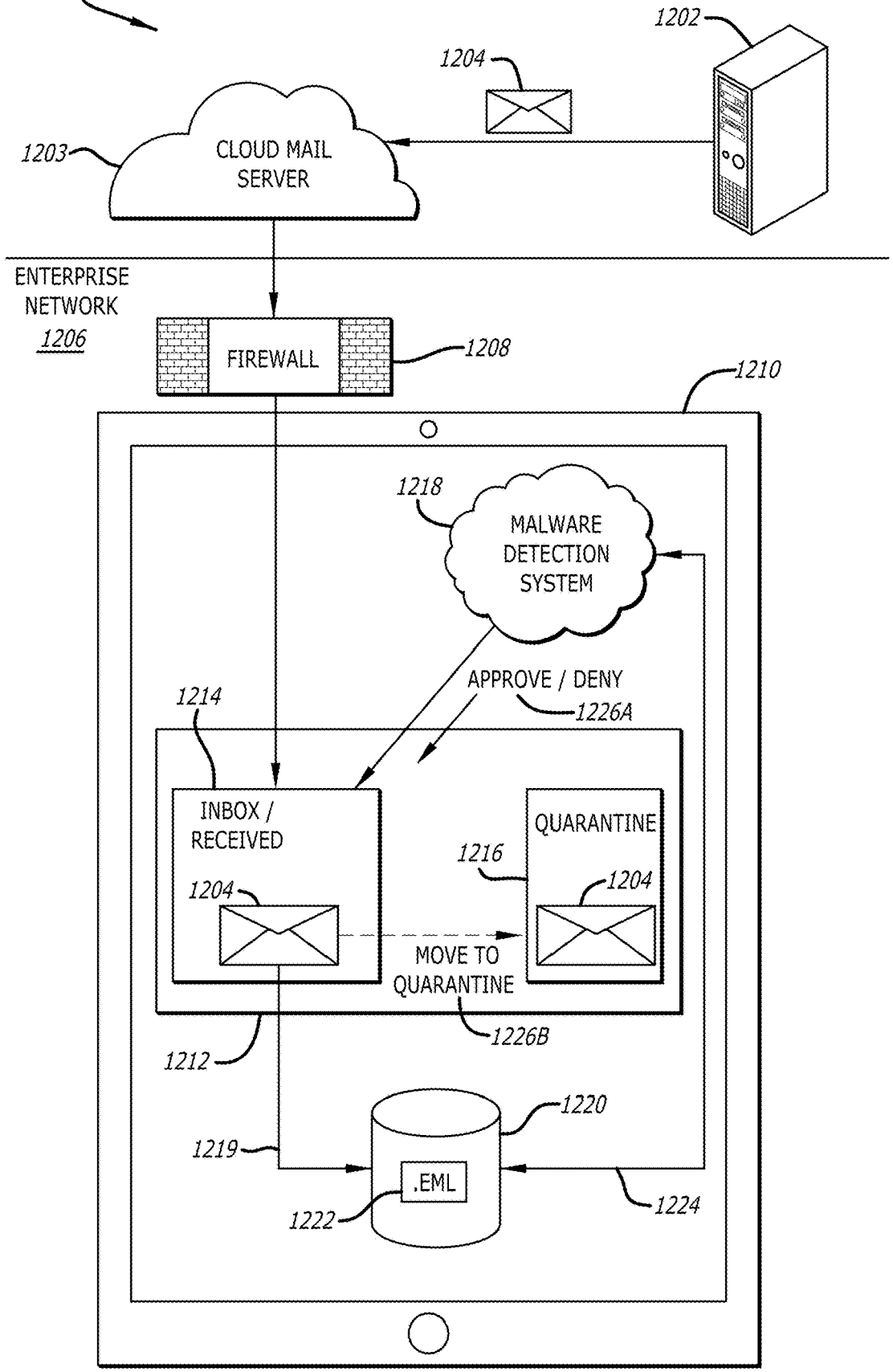
FIG. 12 illustrates a fourth architectural deployment of networked components configured to implement the diagrammatic flow of FIG. 1 according to an embodiment of the disclosure.

Referring to FIG. 12, a fourth architectural deployment of networked components configured to implement the diagrammatic flow of FIG. 1 is shown according to an embodiment of the disclosure. FIG. 12 illustrates a networked environment 1200 including a plurality of networking components, e.g., electronic computing devices configured for exchanging of network traffic, including a compromised server 1202 that may be controlled by a cyber attacker and a cloud mail server 1203. Additional network components are shown in FIG. 1200 operating within a private (enterprise) network 1206, such as a firewall 1208 that is configured to control the transmission of network traffic to and from network devices connected to the enterprise network 1206 such as the network device (endpoint) 1210.

FIG. 12 illustrates that the cyberthreat detection system 1218 and a mail client 1212 are deployed on the endpoint 1210, where the mail client 1212 may be, for example, MICROSOFT® OUTLOOK®. The mail client 1212 may be communicatively coupled to the cloud mail server 1203 and exchange data, such as email 1204, via IMAP. Thus, in some embodiments, the mail client 1212 retrieves emails such the email 1204 from the cloud mail server 1203 via IMAP and stores the email 1204 to a hard disk (e.g., non-transitory computer readable medium) 1220 of the endpoint 1210 (step 1219). For example, the email 1204 may be stored as a .EML file 1222.

The cyberthreat detection system 1018 retrieves the .EML file corresponding to the email 1204 (step 1224) and performs analyses in accordance with the disclosure above to determine whether the email 1204 is malicious and may provide the mail client 1212 with an approve/deny instruction 1226A. When the email 1004 is determined to be malicious, the cyberthreat detection system 1218 may automatically move the email 1204 from an inbox folder (or sub-folder) to a quarantine folder 1216 of the mail client 1212 (optional step 1226B), lock the email 1204 preventing a user from opening the email, or automatically delete the email 1204 either by placing the email 1204 in a deleted/trash folder or by permanently deleting the email 1204. In some embodiments, the cyberthreat detection system 1018 may perform or cause performance of other actions such as those discussed above, e.g., with respect to at least FIGS. 2, 8, and 10.

Figure 13:
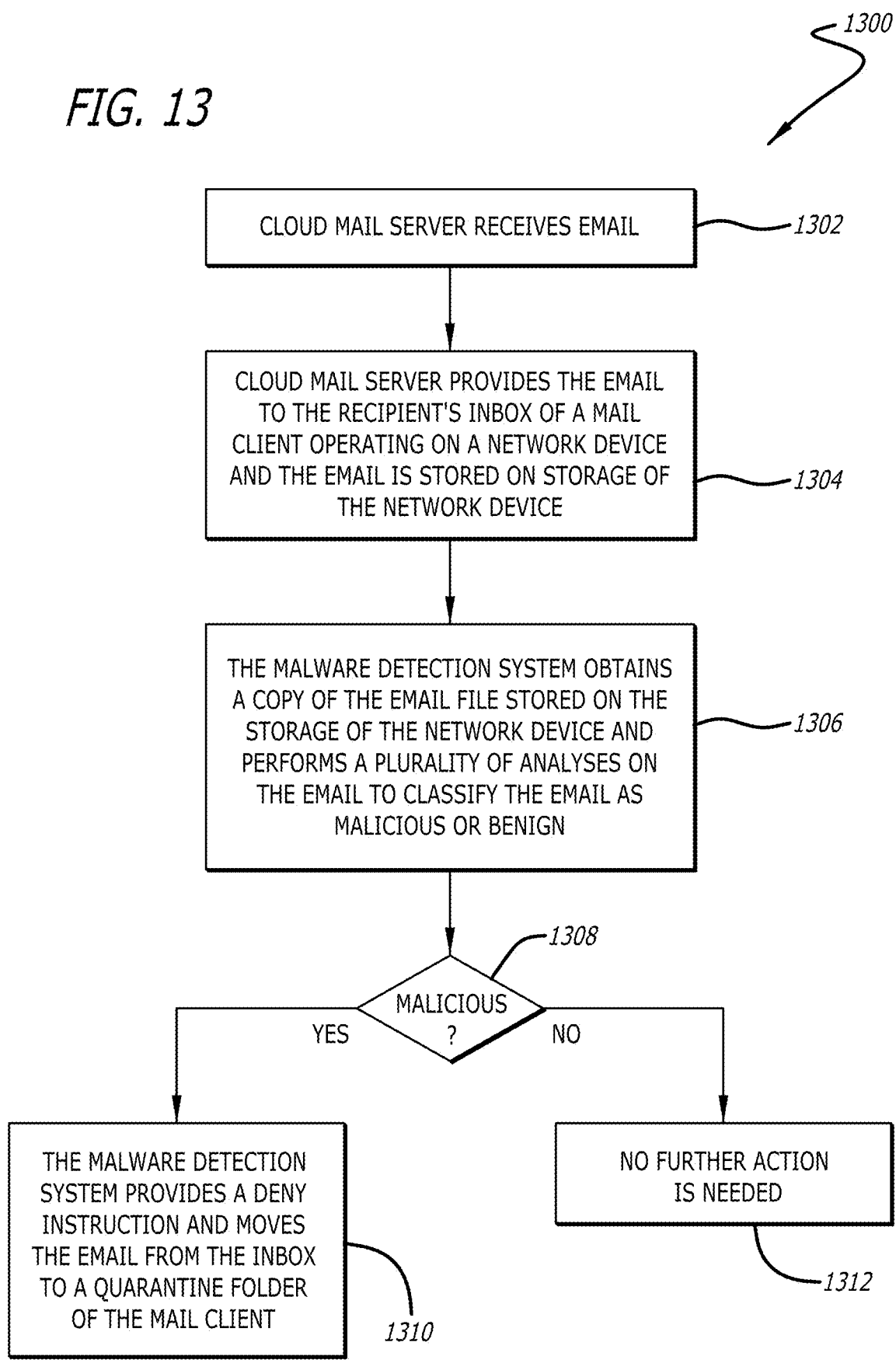
FIG. 13 illustrates a flowchart of a process for detecting malicious or phishing network communications by network components deployed according to the architecture of FIG. 12 according to an embodiment of the disclosure.

Referring to FIG. 13, a flowchart of a process for detecting malicious or phishing network communications by network components deployed according to the architecture of FIG. 12 is shown according to an embodiment of the disclosure. Each block illustrated in FIG. 13 represents an operation in the process 1300 performed by, for example, a cyberthreat detection system 1408 of FIG. 14. It should be understood that not every operation illustrated in FIG. 13 is required. In fact, certain operations may be optional to complete aspects of the process 1300. The process 1300 begins with an email being received by a cloud mail server (block 1302). For example, the email may be received by a third-party that is not listed on an "allow list"; thus, the maliciousness of the email is unknown. The cloud mail server provides the email to the recipient's inbox of a mail client operating on a network device and the email is stored on storage of the network device (block 1304). The cyberthreat detection system obtains a copy of the email file stored on the storage of the network device and performs a plurality of analyses on the email to classify the email as malicious or benign (block 1306).

When the email is determined to be malicious (yes at block 1308), the cyberthreat detection system provides a deny instruction and moves the email from the inbox to a quarantine folder of the mail client and optionally provides additional notifications to the recipient, cloud mail server, or other network components (block 1310.) In many embodiments, when the email is determined to be benign (no at block 1308), no further action is needed (block 1312). As with other embodiments and configurations discussed above, optionally, the approve instruction may instruct the mail client to place a visual indicator appear alongside the email indicating that the cyberthreat detection system has found the email to be benign. For example, a checkmark or other indicator may appear in a preview of the email in inbox or in the email itself.

IV. Logical Representation

Figure 14:
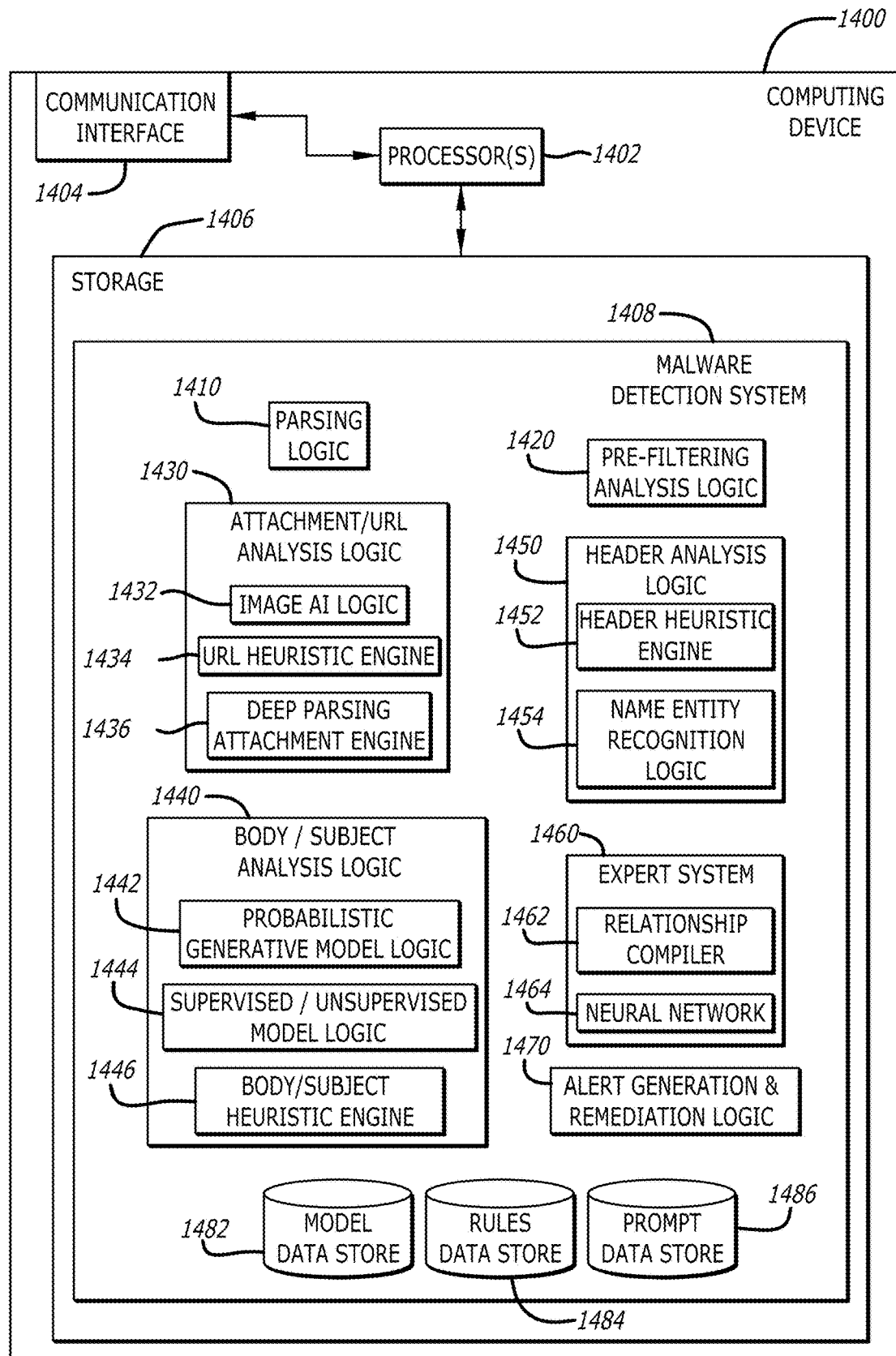
FIG. 14 illustrates a logic diagram illustrating logic components of a cyberthreat detection system according to an implementation of the disclosure.

Referring now to FIG. 14, a logic diagram illustrating logic components of a cyberthreat detection system is shown according to an implementation of the disclosure. In the example shown in FIG. 14 a computing device 1400 includes one or more processors 1402 that is communicatively coupled to a communication interface 1404 and storage 1406, which may be non-transitory computer readable medium. The storage 1406 may have stored thereon logic, e.g., in the form of computer-executable instructions, that, when executed by the processor 1402, cause the processor 1402 to perform the methods described herein.

As used herein, one implementation of a computing device may be a server device that has a memory for storing program code instructions and a hardware processor for executing the instructions. The server device can further include other physical components, such as a network interface or components for input and output. The storage 1406 may include components that collectively may be referred to as a cyberthreat detection system 1408, which includes a parsing logic 1410 configured to parse the email into components, a pre-filtering analysis logic 1420 configured to perform pre-filtering analyses on header information of a received email, and an attachment/URL analysis logic 1430 that includes sub-modules of an image AI logic 1432 (e.g., for performing a CLIP analysis), a URL heuristic engine 1434 configured to perform heuristics on URLs within attachments of the email body/subject line, and a deep parsing attachment engine 1436 configured to perform deep parsing analytics and determine semantics of an attachment to an email.

The cyberthreat detection system 1408 may also include a body/subject analysis logic 1440 that includes a probabilistic generative model logic 1442 configured to deploy a probabilistic generative model, a supervised/unsupervised model logic 1444 configured to deploy one or more supervised/unsupervised models, and a body/subject heuristic engine 1446 configured to perform heuristics on text of the body and subject of the email. The cyberthreat detection system 1408 may also include a header analysis logic 1450 that includes a header heuristic engine 1452 configured to perform heuristics on text of the header of the email and a name entity recognition logic 1454 configured to deploy a model trained to identify and classify names/dates within the header.

Additionally, the cyberthreat detection system 1408 may also include an expert system 1460 that is configured to provide a determination as to whether an email is malicious or benign and includes a relationship compiler 1462 and a neural network 1464. The cyberthreat detection system 1408 may further include an alert generation and remediation logic 1470 configured to generate alerts, notifications, dashboards, execute remedial or proactive operations such as deleting a malicious email or moving a malicious from an inbox to a quarantine folder, or execute operations resulting in other remedial or proactive operations as discussed above.

Additionally, the cyberthreat detection system 1408 may also include various data stores as needed to store data discussed above and, for example, may include specific data stores such as a model data store 1482, a rules data store 1484 for storing heuristics, and a prompt data store 1486. In some examples, the data storages may be stored elsewhere and be accessible to the cyberthreat detection system 1408. Examples of such storage include non-transitory computer-readable mediums, such as a magnetic or optical storage disk or a flash or solid-state memory, from which the program code can be loaded into the memory of the computing device 1400 for execution. The term "non-transitory" refers to retention of the program code by the computer-readable medium while not under power, while volatile or "transitory" memory or media requires power in order to retain data.

Various examples and possible implementations have been described above, which recite certain features and/or functions. Although these examples and implementations have been described in language specific to structural features and/or functions, it is understood that the subject matter defined in the appended claims is not necessarily limited to the specific features or functions described above. Rather, the specific features and functions described above are disclosed as examples of implementing the claims, and other equivalent features and acts are intended to be within the scope of the claims. Further, any or all of the features and functions described above can be combined with each other, except to the extent it may be otherwise stated above or to the extent that any such embodiments may be incompatible by virtue of their function or structure, as will be apparent to persons of ordinary skill in the art. Unless contrary to physical possibility, it is envisioned that (i) the methods/steps described herein may be performed in any sequence and/or in any combination, and (ii) the components of respective embodiments may be combined in any manner.

Processing of the various components of systems illustrated herein can be distributed across multiple machines, networks, and other computing resources. Two or more components of a system can be combined into fewer components. Various components of the illustrated systems can be implemented in one or more virtual machines or an isolated execution environment, rather than in dedicated computer hardware systems and/or computing devices. Likewise, data stores can represent physical and/or logical data storage, including, e.g., storage area networks or other distributed storage systems. Moreover, in some embodiments the connections between the components shown represent possible paths of data flow, rather than actual connections between hardware. While some examples of possible connections are shown, any of the subset of the components shown can communicate with any other subset of components in various implementations.

Examples have been described with reference to flow chart illustrations and/or block diagrams of methods, apparatus (systems), and computer program products. Each block of the flow chart illustrations and/or block diagrams, and combinations of blocks in the flow chart illustrations and/or block diagrams, may be implemented by computer program instructions. Such instructions may be provided to a processor of a computing device for execution thereby resulting in performance of the operations described in the flow chart by one or more components of the networked environments illustrated or described herein. These computer program instructions may also be stored in a non-transitory computer-readable memory that can direct a computer or other programmable data processing apparatus to operate in a particular manner, such that the instructions stored in the computer-readable memory produce an article of manufacture including instruction means which implement the acts specified in the flow chart and/or block diagram block or blocks. The computer program instructions may also be loaded to a computing device or other programmable data processing apparatus to cause operations to be performed on the computing device or other programmable apparatus to produce a computer implemented process such that the instructions which execute on the computing device or other programmable apparatus provide steps for implementing the acts specified in the flow chart and/or block diagram block or blocks.

In some embodiments, certain operations, acts, events, or functions of any of the algorithms described herein can be performed in a different sequence, can be added, merged, or left out altogether (e.g., not all are necessary for the practice of the algorithms). In certain embodiments, operations, acts, functions, or events can be performed concurrently, e.g., through multi-threaded processing, interrupt processing, or multiple processors or processor cores or on other parallel architectures, rather than sequentially.

What is claimed is:

1. A computerized method for detecting a zero-shot cyberthreat comprising:
   obtaining an electronic message;
   parsing the electronic message into components including body and subject line information, wherein the electronic message is parsed into components including the body and subject line information and header information;
   performing a pre-filtering analysis on the header information of the electronic message including a set of operations, wherein failing to meet a criteria of one of the set of operations results in the electronic being further analyzed as part of the cyberthreat detection process, and wherein meeting the criteria of each of the set of operations results in the electronic message bypassing further analysis as part of the cyberthreat detection process, wherein the set of operations includes:
   detecting the electronic message does not include an attachment,
   detecting the electronic message does not a call-to-action uniform resource locator (URL) in the body and subject line information,
   determining that the electronic message was automatically generated by a known entity based on a sender's email address and detecting that the known entity is present on a predetermined allow-list,
   detecting that the body and subject line information is provided in a specified language,
   identifying a number of images attached to or included in the email meets or exceeds a threshold number of images,
   detecting that a size of one or more of the images, individually or in combination, meets or exceeds a size threshold, or
   identifying a file extension type of an attachment of the email and detecting that the file extension type is present on a predefined allow-list;
   determining a likelihood probability that the electronic message is directed to one of a predefined set of topics by deploying a probabilistic generative model, wherein the electronic message has a likelihood probability of being directed to a first topic of at least a first threshold;

generating a prompt for a language model based on the first topic;

providing the prompt and the body and subject line information of the electronic message to the language model;

generating a semantic result based on a response to the prompt from the language model;

classifying, by a relationship compiler or a neural network, the electronic message as malicious or benign based on the semantic result; and generating a graphical user interface display that indicates whether the electronic message has been classified as malicious or benign.

2. The computerized method of claim 1, further comprising:

an analysis of the header information including:

performing a heuristic analysis of the header information resulting in first semantics of the header information, and performing a name entity recognition analysis of the header information resulting in second semantics of the header information, wherein classifying, by the relationship compiler or the neural network, the electronic message as malicious or benign is based on (i) the semantic result based on the response to the prompt from the language model, and (ii) the first semantics of the header information and the second semantics of the header information.

3. The computerized method of claim 1, further comprising:

an analysis of an attachment or a uniform resource locator (URL) including operations of:

analyzing the attachment including (i) extracting text from the attachment and providing the text to the probabilistic generative model of the first sub-analysis, (ii) deploying a deep learning neural network taking an image within the attachment as input and identifying text within the image as representing a brand, logo, or name of an entity included on a predefined corporate entity list, or (iii) performing a deep file parsing analysis including detecting whether the attachment includes embedded software code, Application Programming Interface (API) calls, or redirect webpage links, or analyzing the URL including performing a heuristic analysis of the URL resulting in semantics of the URL.

4. The computerized method of claim 1, wherein the graphical user interface display is configured to receive user input that causes an automatic deletion of the electronic message, an address of a sender of the electronic message to be blocked by an email client or a firewall, or a first URL detected in the electronic message to be blocked by the firewall.

5. The computerized method of claim 1, further comprising:

when the electronic message is classified as malicious, automatically moving the electronic message from an inbox of an email client to a secondary folder that indicates the electronic message has been classified as malicious.

6. A computing device, comprising:

a processor; and a non-transitory computer-readable medium having stored thereon instructions that, when executed by the processor, cause the processor to perform operations including:

obtaining an electronic message;

parsing the electronic message into components including body and subject line information, wherein the electronic message is parsed into components including the body and subject line information and header information;

performing a pre-filtering analysis on the header information of the electronic message including a set of operations, wherein failing to meet a criteria of one of the set of operations results in the electronic being further analyzed as part of the cyberthreat detection process, and wherein meeting the criteria of each of the set of operations results in the electronic message bypassing further analysis as part of the cyberthreat detection process, wherein the set of operations includes:

detecting the electronic message does not include an attachment, detecting the electronic message does not a call-to-action uniform resource locator (URL) in the body and subject line information, determining that the electronic message was automatically generated by a known entity based on a sender's email address and detecting that the known entity is present on a predetermined allow-list, detecting that the body and subject line information is provided in a specified language, identifying a number of images attached to or included in the email meets or exceeds a threshold number of images, detecting that a size of one or more of the images, individually or in combination, meets or exceeds a size threshold, or identifying a file extension type of an attachment of the email and detecting that the file extension type is present on a predefined allow-list;

determining a likelihood probability that the electronic message is directed to one of a predefined set of topics by deploying a probabilistic generative model, wherein the electronic message has a likelihood probability of being directed to a first topic of at least a first threshold;

generating a prompt for a language model based on the first topic;

providing the prompt and the body and subject line information of the electronic message to the language model;

generating a semantic result based on a response to the prompt from the language model;

classifying, by a relationship compiler or a neural network, the electronic message as malicious or benign based on the semantic result; and generating a graphical user interface display that indicates whether the electronic message has been classified as malicious or benign.

7. The computing device of claim 6, wherein the operations further include:

an analysis of the header information including:

performing a heuristic analysis of the header information resulting in first semantics of the header information, and performing a name entity recognition analysis of the header information resulting in second semantics of the header information, wherein classifying, by the relationship compiler or the neural network, the electronic message as malicious or benign is based on (i) the semantic result based on the response to the prompt from the language model, and (ii) the first semantics of the header information and the second semantics of the header information.

8. The computing device of claim 6, wherein the operations further include:
an analysis of an attachment or a uniform resource locator (URL) including operations of:
analyzing the attachment including (i) extracting text from the attachment and providing the text to the probabilistic generative model of the first sub-analysis, (ii) deploying a deep learning neural network taking an image within the attachment as input and identifying text within the image as representing a brand, logo, or name of an entity included on a predefined corporate entity list, or (iii) performing a deep file parsing analysis including detecting whether the attachment includes embedded software code, Application Programming Interface (API) calls, or redirect webpage links, or
analyzing the URL including performing a heuristic analysis of the URL resulting in semantics of the URL.

9. The computing device of claim 6, wherein the graphical user interface display is configured to receive user input that causes an automatic deletion of the electronic message, an address of a sender of the electronic message to be blocked by an email client or a firewall, or a first URL detected in the electronic message to be blocked by the firewall.

10. The computing device of claim 6, wherein the operations further include:
when the electronic message is classified as malicious, automatically moving the electronic message from an inbox of an email client to a secondary folder that indicates the electronic message has been classified as malicious.

11. A non-transitory computer-readable medium having stored thereon instructions that, when executed by one or more processors, cause the one or more processor to perform operations including:
obtaining an electronic message;
parsing the electronic message into components including body and subject line information, wherein the electronic message is parsed into components including the body and subject line information and header information;
performing a pre-filtering analysis on the header information of the electronic message including a set of operations, wherein failing to meet a criteria of one of the set of operations results in the electronic being further analyzed as part of the cyberthreat detection process, and wherein meeting the criteria of each of the set of operations results in the electronic message bypassing further analysis as part of the cyberthreat detection process, wherein the set of operations includes:
detecting the electronic message does not include an attachment,
detecting the electronic message does not a call-to-action uniform resource locator (URL) in the body and subject line information,
determining that the electronic message was automatically generated by a known entity based on a sender's email address and detecting that the known entity is present on a predetermined allow-list, detecting that the body and subject line information is provided in a specified language,
identifying a number of images attached to or included in the email meets or exceeds a threshold number of images,
detecting that a size of one or more of the images, individually or in combination, meets or exceeds a size threshold, or
identifying a file extension type of an attachment of the email and detecting that the file extension type is present on a predefined allow-list;
determining a likelihood probability that the electronic message is directed to one of a predefined set of topics by deploying a probabilistic generative model, wherein the electronic message has a likelihood probability of being directed to a first topic of at least a first threshold;
generating a prompt for a language model based on the first topic;
providing the prompt and the body and subject line information of the electronic message to the language model;
generating a semantic result based on a response to the prompt from the language model;
classifying, by a relationship compiler or a neural network, the electronic message as malicious or benign based on the semantic result; and
generating a graphical user interface display that indicates whether the electronic message has been classified as malicious or benign.

12. The non-transitory computer-readable medium of claim 11, wherein the electronic message is parsed into components including the body and subject line information and header information, and
wherein the operations further include:
an analysis of the header information including:
performing a heuristic analysis of the header information resulting in first semantics of the header information, and
performing a name entity recognition analysis of the header information resulting in second semantics of the header information, wherein classifying, by the relationship compiler or the neural network, the electronic message as malicious or benign is based on (i) the semantic result based on the response to the prompt from the language model, and (ii) the first semantics of the header information and the second semantics of the header information.

13. The non-transitory computer-readable medium of claim 11, wherein the operations further include:
an analysis of an attachment or a uniform resource locator (URL) including operations of:
analyzing the attachment including (i) extracting text from the attachment and providing the text to the probabilistic generative model of the first sub-analysis, (ii) deploying a deep learning neural network taking an image within the attachment as input and identifying text within the image as representing a brand, logo, or name of an entity included on a predefined corporate entity list, or (iii) performing a deep file parsing analysis including detecting whether the attachment includes embedded software code, Application Programming Interface (API) calls, or redirect webpage links, or
analyzing the URL including performing a heuristic analysis of the URL resulting in semantics of the URL.

14. The non-transitory computer-readable medium of claim 11, wherein the graphical user interface display is configured to receive user input that causes an automatic deletion of the electronic message, an address of a sender of the electronic message to be blocked by an email client or a firewall, or a first URL detected in the electronic message to be blocked by the firewall.

15. The non-transitory computer-readable medium of claim 11, wherein the operations further include:
when the electronic message is classified as malicious, automatically moving the electronic message from an inbox of an email client to a secondary folder that indicates the electronic message has been classified as malicious.

* * * * *